United States Patent [19]

Lagerwall et al.

[11] Patent Number: 4,904,064

[45] Date of Patent: Feb. 27, 1990

[54] ELECTRONIC ADDRESSING OF FERROELECTRIC AND FLEXOELECTRIC LIQUID CRYSTAL DEVICES

[75] Inventors: Sven T. Lagerwall, Gothenburg, Sweden; Jürgen Wahl, Bad Soden, Fed. Rep. of Germany

[73] Assignee: S.A.R.L. S T Lagerwall, Bandol, France

[21] Appl. No.: 72,981

[22] PCT Filed: Oct. 14, 1986

[86] PCT No.: PCT/SE86/00476

§ 371 Date: Jun. 15, 1987

§ 102(e) Date: Jun. 15, 1987

[87] PCT Pub. No.: WO87/02495

PCT Pub. Date: Apr. 23, 1987

[30] Foreign Application Priority Data

Oct. 14, 1985 [SE] Sweden .............................. 8504760-3

[51] Int. Cl.[4] .............................................. G02F 1/13

[52] U.S. Cl. ................................ 350/350 S; 350/333; 350/340

[58] Field of Search .................... 350/340, 350 S, 333, 350/332

[56] References Cited

U.S. PATENT DOCUMENTS

| | | | |
|---|---|---|---|
| 4,367,924 | 1/1983 | Clark et al. | 350/350 S |
| 4,508,429 | 4/1985 | Nagai et al. | 350/333 |
| 4,563,059 | 1/1986 | Clark et al. | 350/350 S |
| 4,564,266 | 1/1986 | Durand et al. | 350/346 X |
| 4,591,886 | 5/1986 | Umeda et al. | 350/350 S |
| 4,625,204 | 11/1986 | Clerc | 350/333 |
| 4,712,877 | 12/1987 | Okada et al. | 350/350 S |
| 4,715,688 | 12/1987 | Harada et al. | 350/333 |

FOREIGN PATENT DOCUMENTS

| | | | |
|---|---|---|---|
| 0149899 | 7/1985 | European Pat. Off. . | |
| 0167398 | 1/1986 | European Pat. Off. . | |
| 0173246 | 3/1986 | European Pat. Off. . | |
| 60-123825 | 7/1985 | Japan | 350/350 S |
| 2156131 | 10/1985 | United Kingdom . | |

OTHER PUBLICATIONS

Kondo et al., "A Practical Method of Preparing Thin Homogeneous Ferroelectric Smectic Cells for Electro-Optical Microsecond Switches", Japanese J. of Appl. Phys., vol. 22, No. 2, 2/1983, pp. L85–L87.

Blinov, "Electro Optical and Magneto-Optical Properties of Liquid Crystals", John Wiley & Sons Ltd., N.Y., pp. 134–145, 1983.

*Primary Examiner*—Stanley D. Miller
*Assistant Examiner*—Huy K. Mai
*Attorney, Agent, or Firm*—Young & Thompson

[57] ABSTRACT

A driving method is provided for arrays of liquid crystal elements having a linear response to an applied electric field, and specifically ferroelectric liquid crystals capable of two surface-stabilized states. The presented schemes write simultaneously both states in one scan of the array, recognizing both the threshold as a critical voltage-time area and keeping this integrated averaged area equal to zero for symmetrically responding pixels. The voltage pulse trains are optimized to intrinsically assure stabilizing rms torques without applying separate holding voltages. Improvements in contrast and frame writing speed are achieved by optimizing driving parameters and scan procedures, such as scanning in loops, in combination with impedance switching.

8 Claims, 19 Drawing Sheets

(a) (b) (c)

ELECTRONIC ADDRESSING OF FERROELECTRIC AND FLEXOELECTRIC LIQUID CRYSTAL DEVICES

INTRODUCTION

The present invention relates to the art of electronic driving of liquid crystal devices, more precisely those devices containing a liquid crystal medium that, at least partly, shows a linear response to an applied electric field. Examples of such liquid crystal media are ferroelectric and flexoelectric liquid crystal configurations. All chiral tilted smectic liquid crystals are ferroelectric and also have the potential of showing a flexoelectric response in a number of deformed configurations. Nematic liquid crystals behave flexoelectric in certain deformed configurations. Presently, great expectations are being attached to the ferroelectric liquid crystals (FLC) due to some valuable and long sought for properties that can hardly be found in the other kinds of liquid crystals. This is particularly true for the so-called surface-stabilized ferroelectric liquid crystals (SSFLC) which have been made polarizable by surface interactions and in which any inherent helix, even if present in the bulk, would nevertheless not appear as a result of the same surface interactions. SSFLC cells are easily polarizable and are capable of high speed, bistability, grey scale and colour performance. These properties are, however, very sensitive to, and interrelated with, the design and alignment of the cell, and with the design of the addressing scheme required for the electric pulse driving circuitry. A small number of operating ferroelectric devices have been demonstrated but so far no really satisfactory driving schemes have been proposed and applied to the ferroelectric case. This is due to the fact that not all the important differences between FLC and nematic driving characteristics have been recognized and thus the addressing requirements not fully analyzed. Driving schemes proposed so far can be found in the European patent application 0 092 181 (Hitachi, filing date Apr. 14, 1983), in the German patent application DE 3 414 704 Al (Canon Inc, filing date Apr. 18, 1984), in the German patent application DE 3 443 011 Al (Canon Inc., filing date Nov. 26, 1984) and in the European patent application 0 149 899 (Seiko Instruments and Electronics, filing date Dec. 7, 1984).

The prior art devices and methods might work more or less well under certain conditions, but in view of our analysis of the prevailing conditions, particularly in SSFLC devices, the prior art propositions will not be able to solve the problems of electrical addressing, especially with respect to good optical contrast. The problems are accentuated by the physical dimensions and properties of SSFLC devices, where the liquid crystal is confined in a very small space between two plates. This means, among other things, that charge accumulation on the plate surfaces will create substantial electrical fields, which are objectional in several ways.

It is an object of the present invention to design a method for electrically addressing liquid crystal devices, which takes into account those difficulties, in order to fully utilize the intrinsic advantages of bistability and fastness, particularly in FLC devices.

For the FLC addressing, which has to be considerably different from conventional liquid crystal addressing, general requirements will now first be identified and then, finally, examples will be given for well-performing multiplex addressing schemes.

The present invention will now be elucidated by reference to the drawings.

Figure 8:
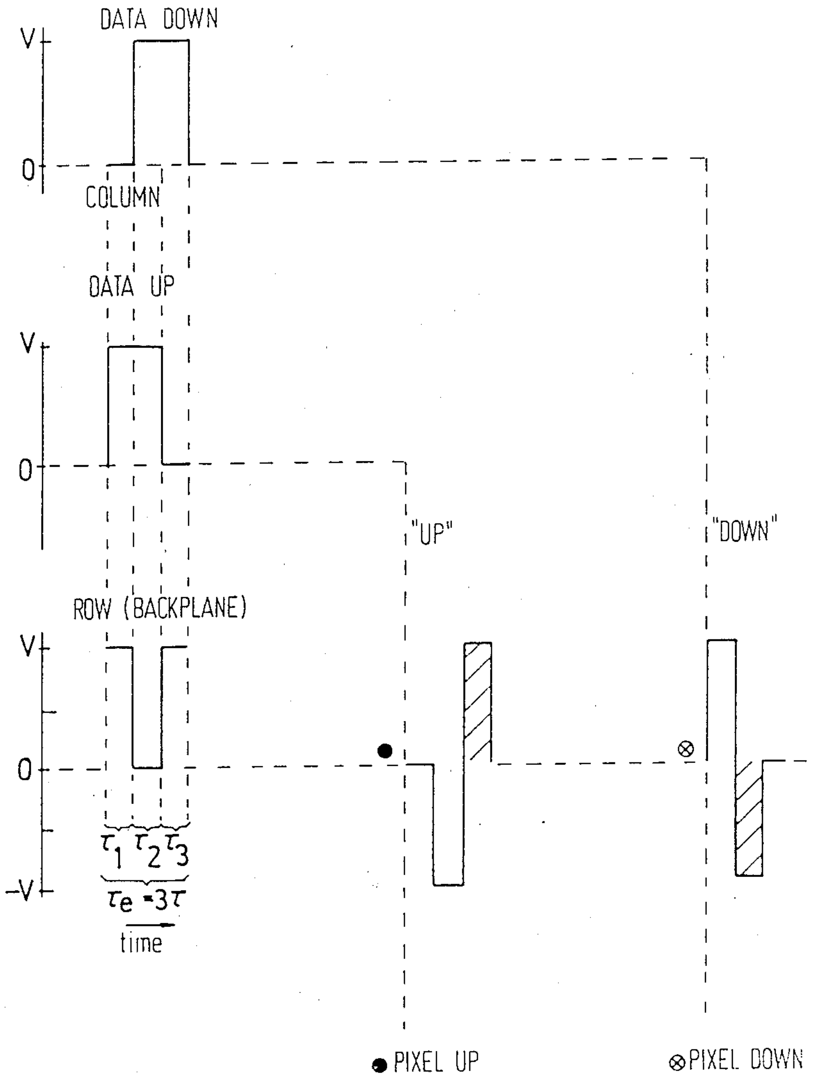

FIG. 8 gives an example for DC compensated driving of a linear array.

Figure 9:
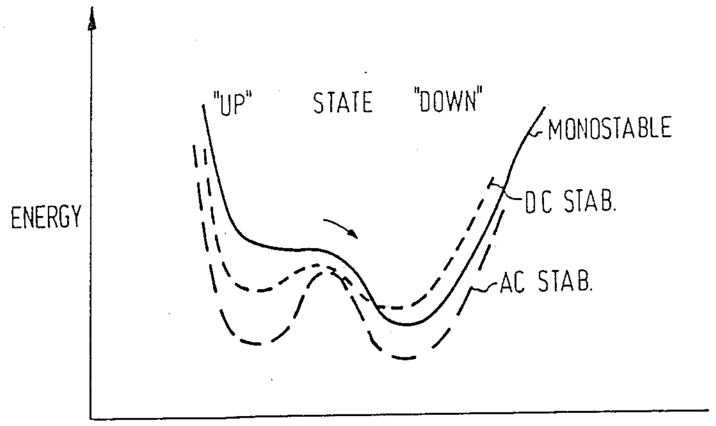

FIG. 9 explains DC and AC-stabilization of a weakly bistable or a primarily monostable liquid crystal cell configuration.

FIGS. 10, 11, 12 and 13 show different schemes for multiplex drive.

Figure 14:
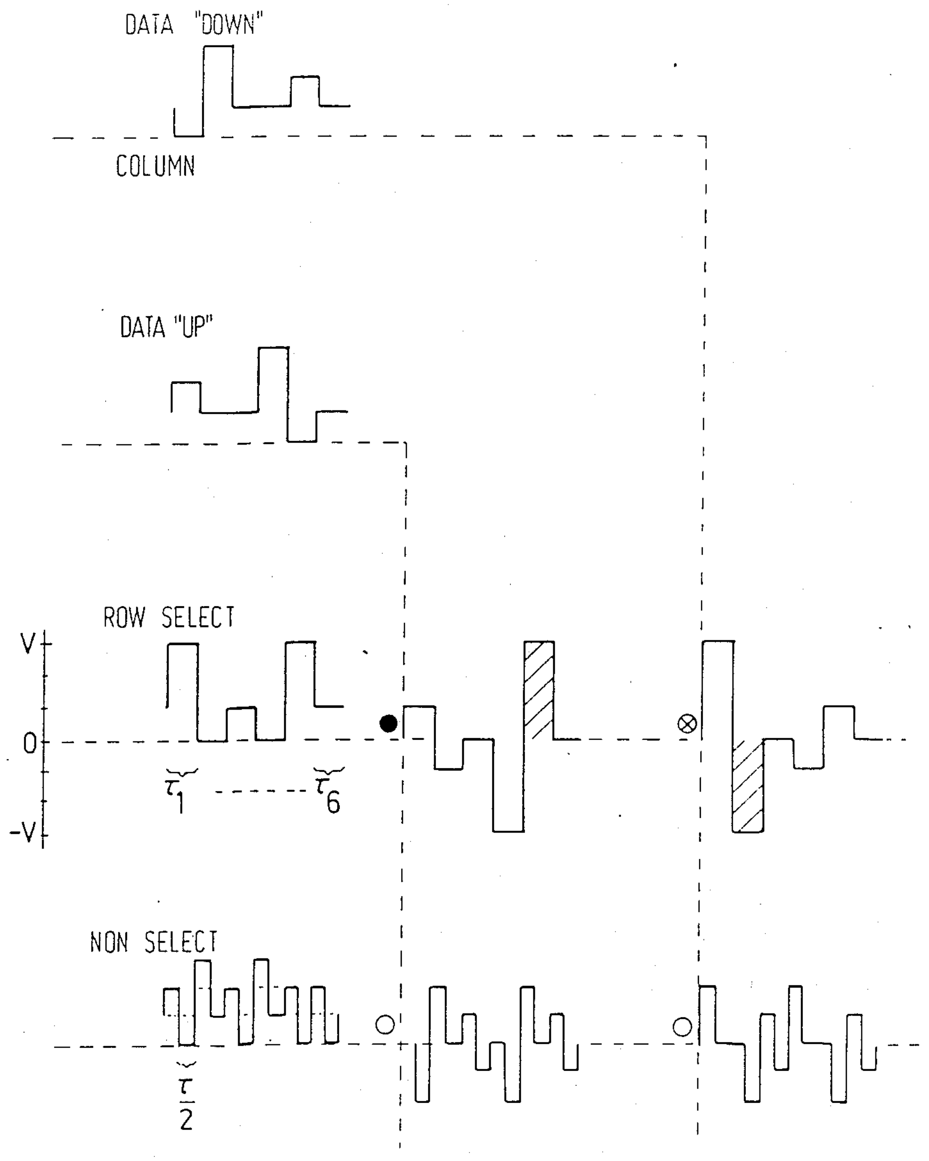

FIG. 14 gives an examples of a driving scheme with AC stabilization.

Figure 15:
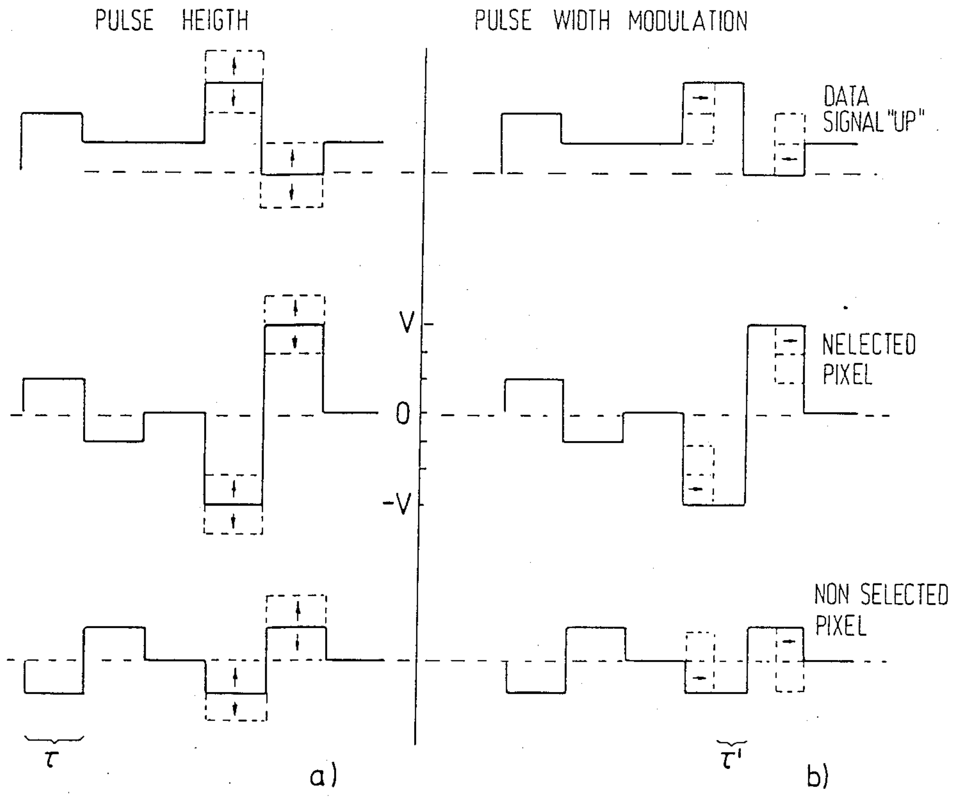

FIG. 15 illustrates pulse width and pulse height modulation for grey scale driving.

Figure 16:
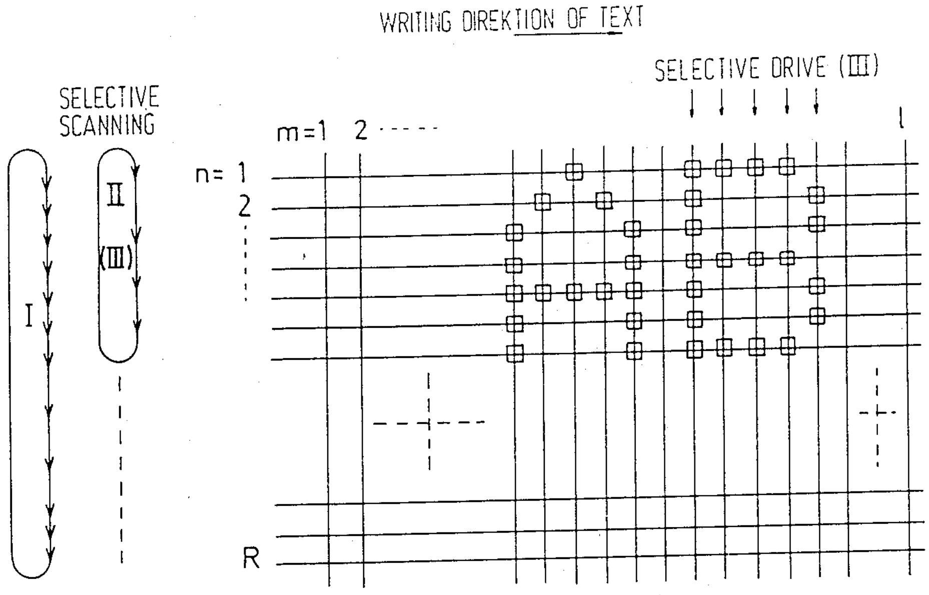

FIG. 16 schematically illustrates selective row scanning and selective column driving methods.

Figure 12:
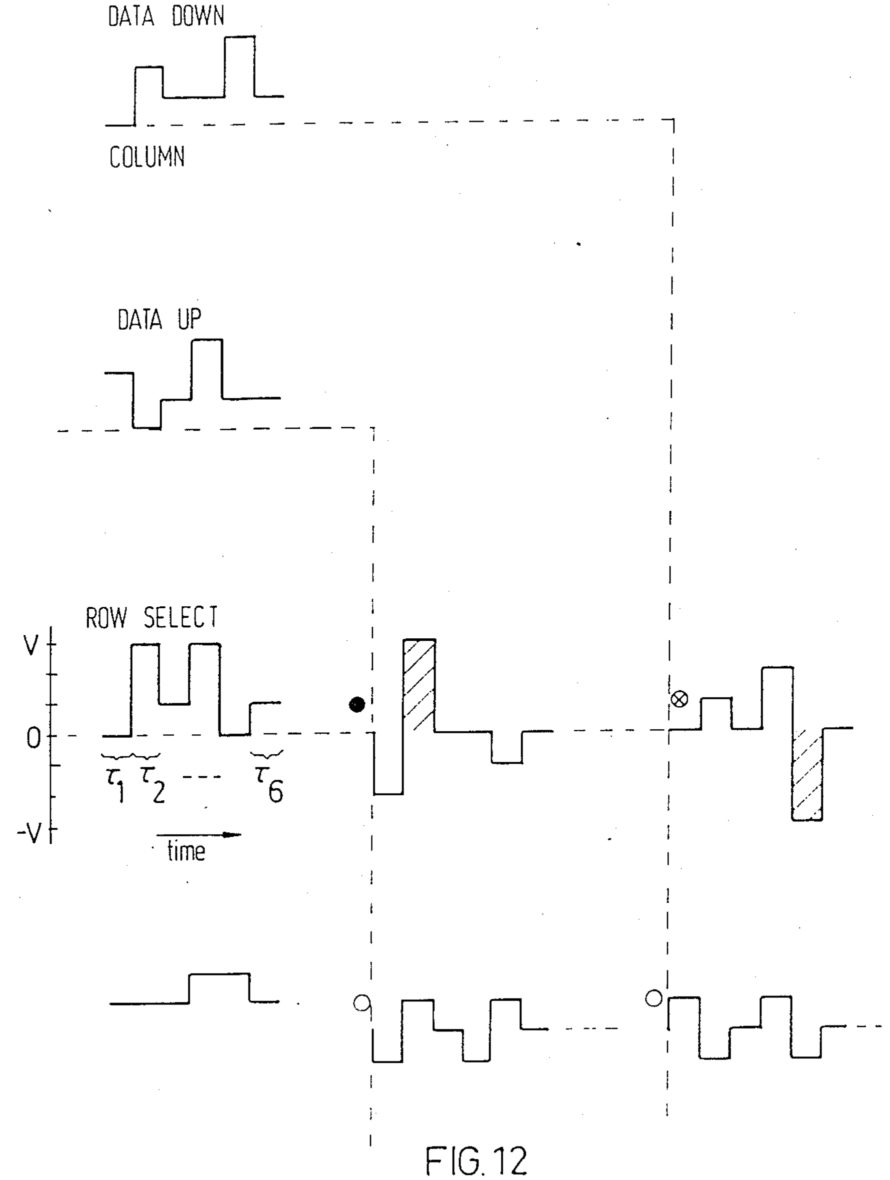
Figure 17:
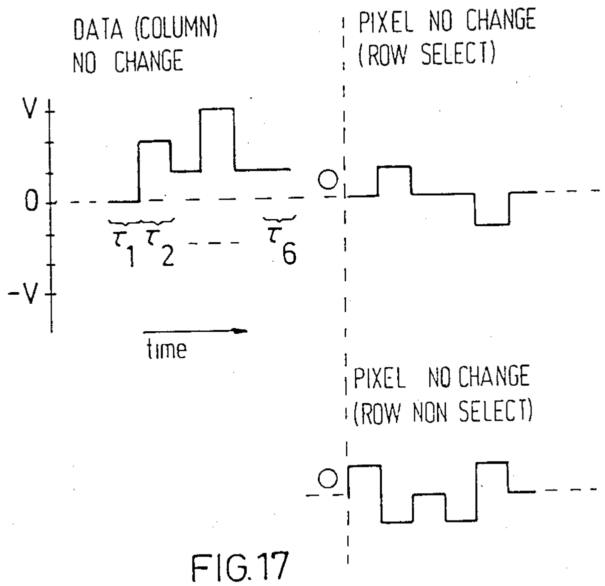

FIG. 17 shows additional "no change" pulse trains for the scheme in FIG. 12 to be used for the selective column driving method.

Figure 18:
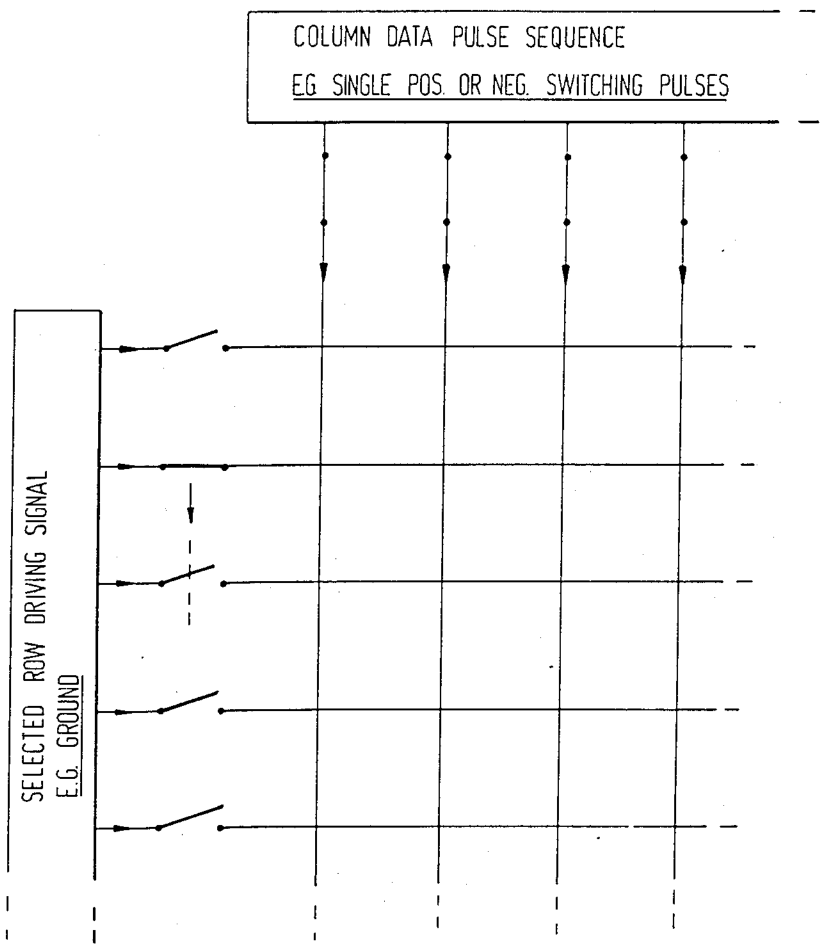

FIG. 18 illustrates high impedance switching concepts.

Figure 19:
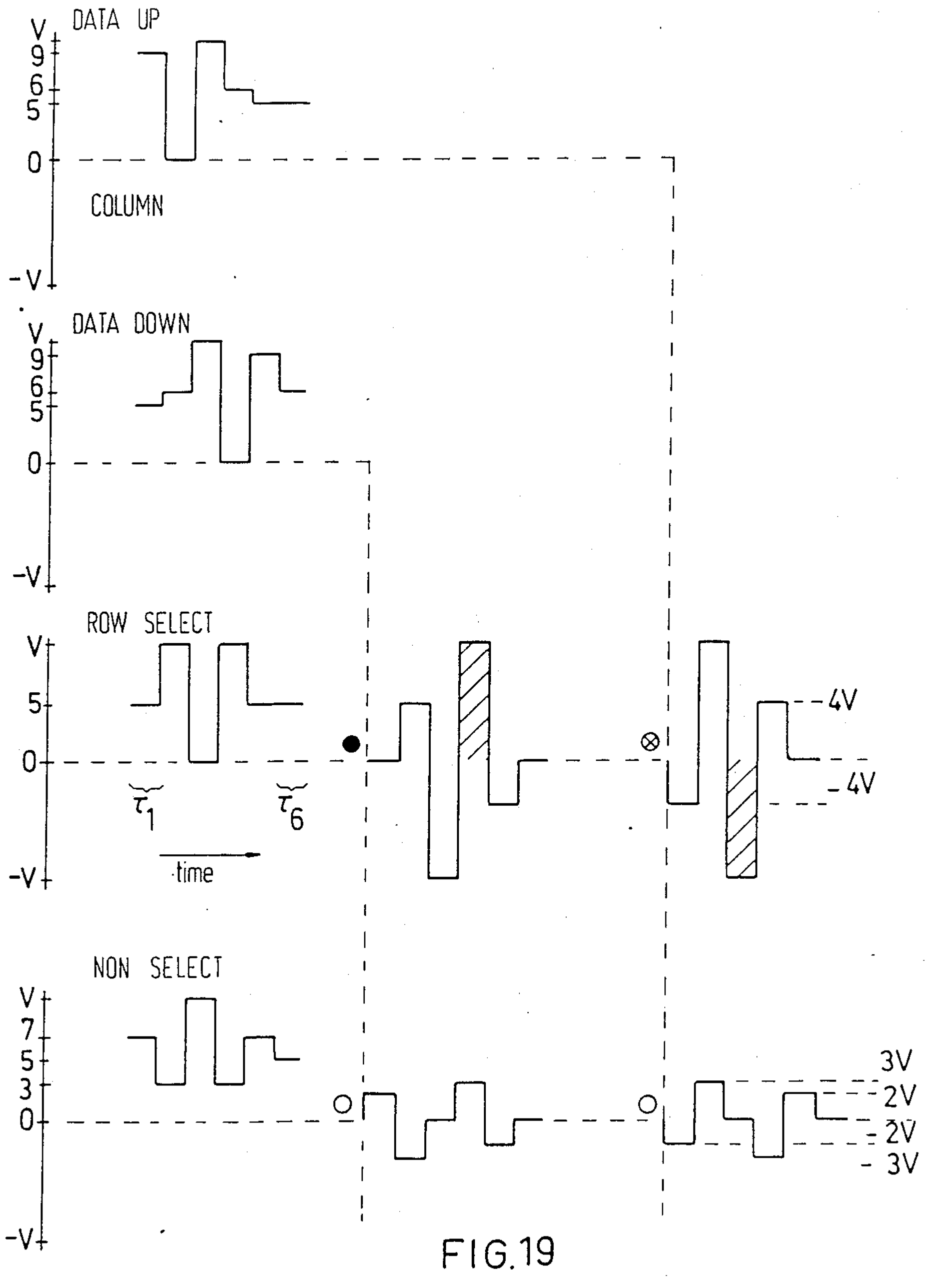

FIG. 19 gives an example of a driving scheme with an increased selection ratio by decreased voltage amplitudes across pixels or nonselected lines.

Figure 20A:
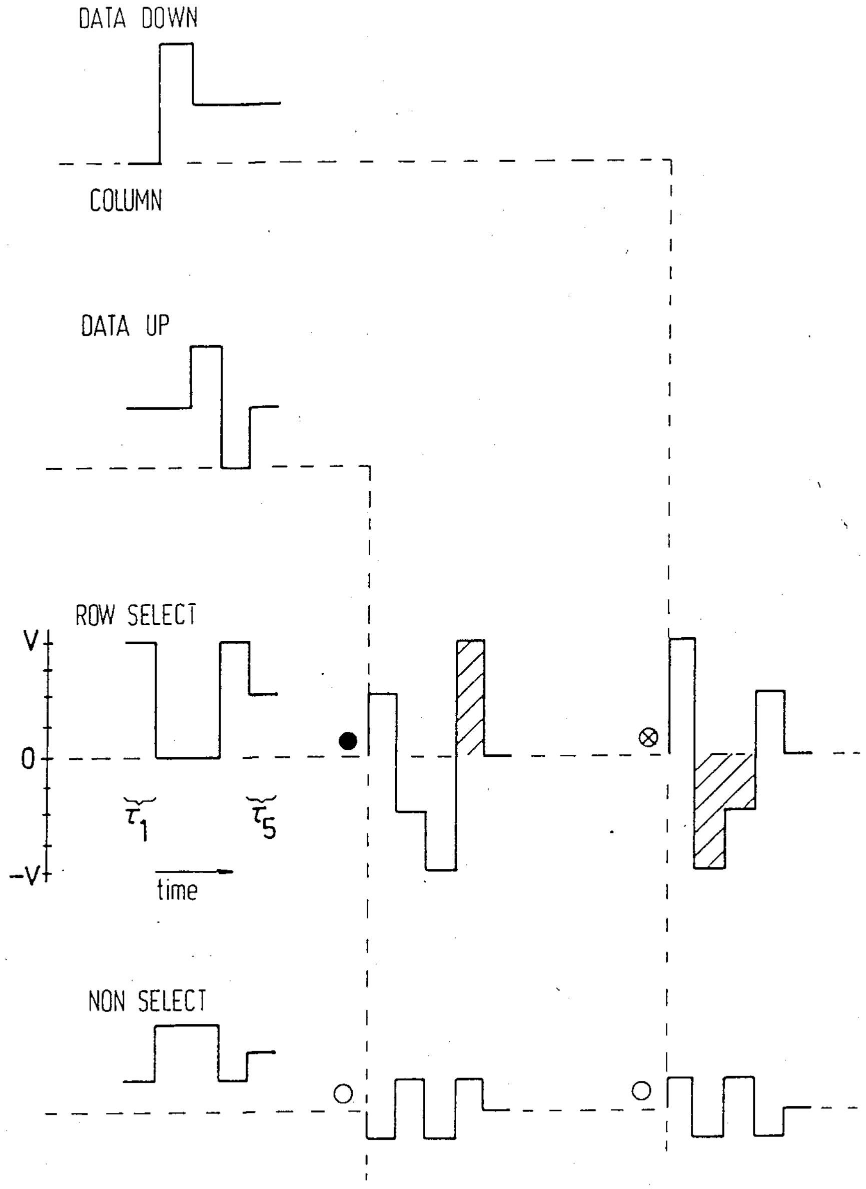
Figure 20B:
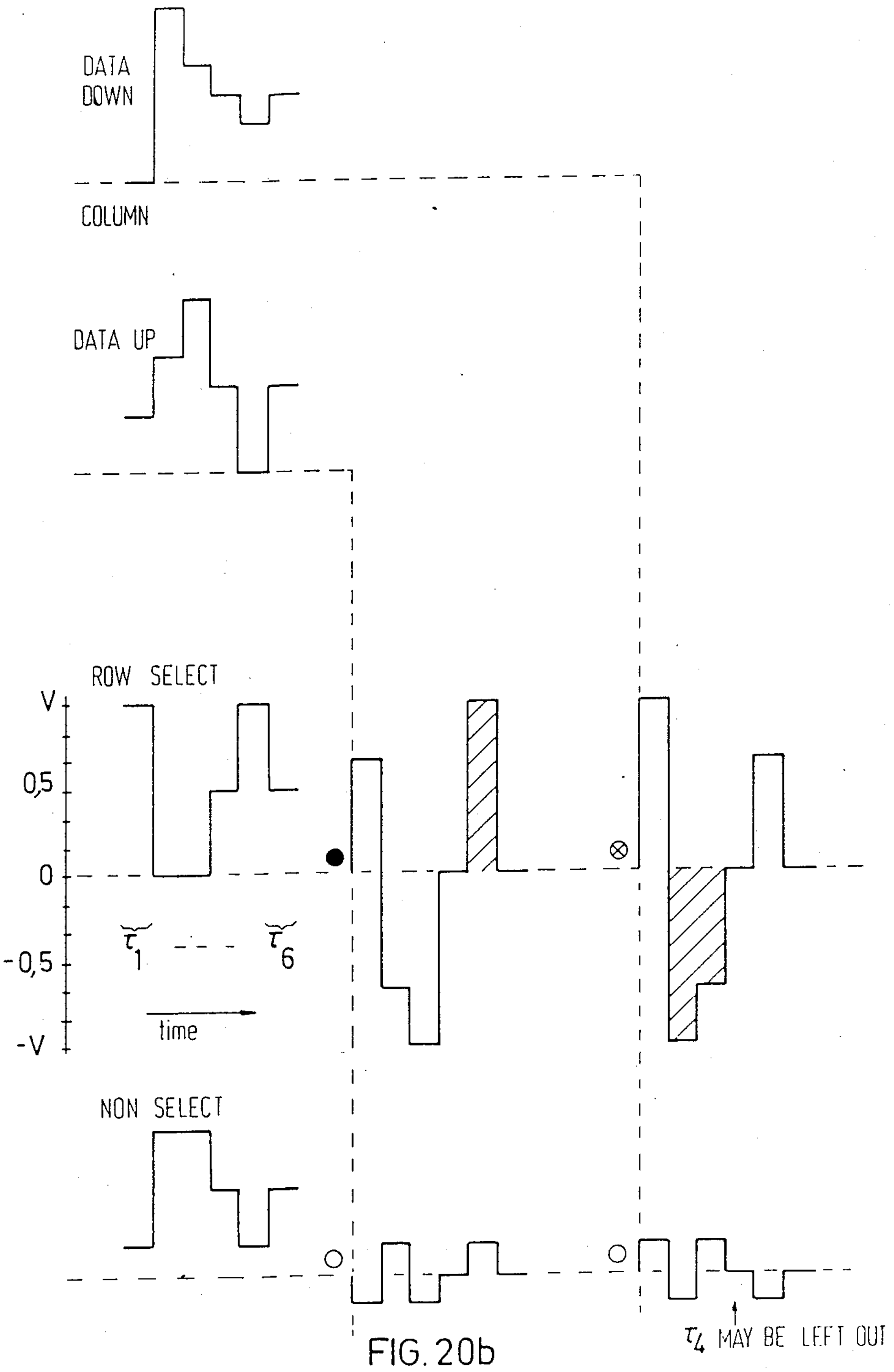
Figure 21:
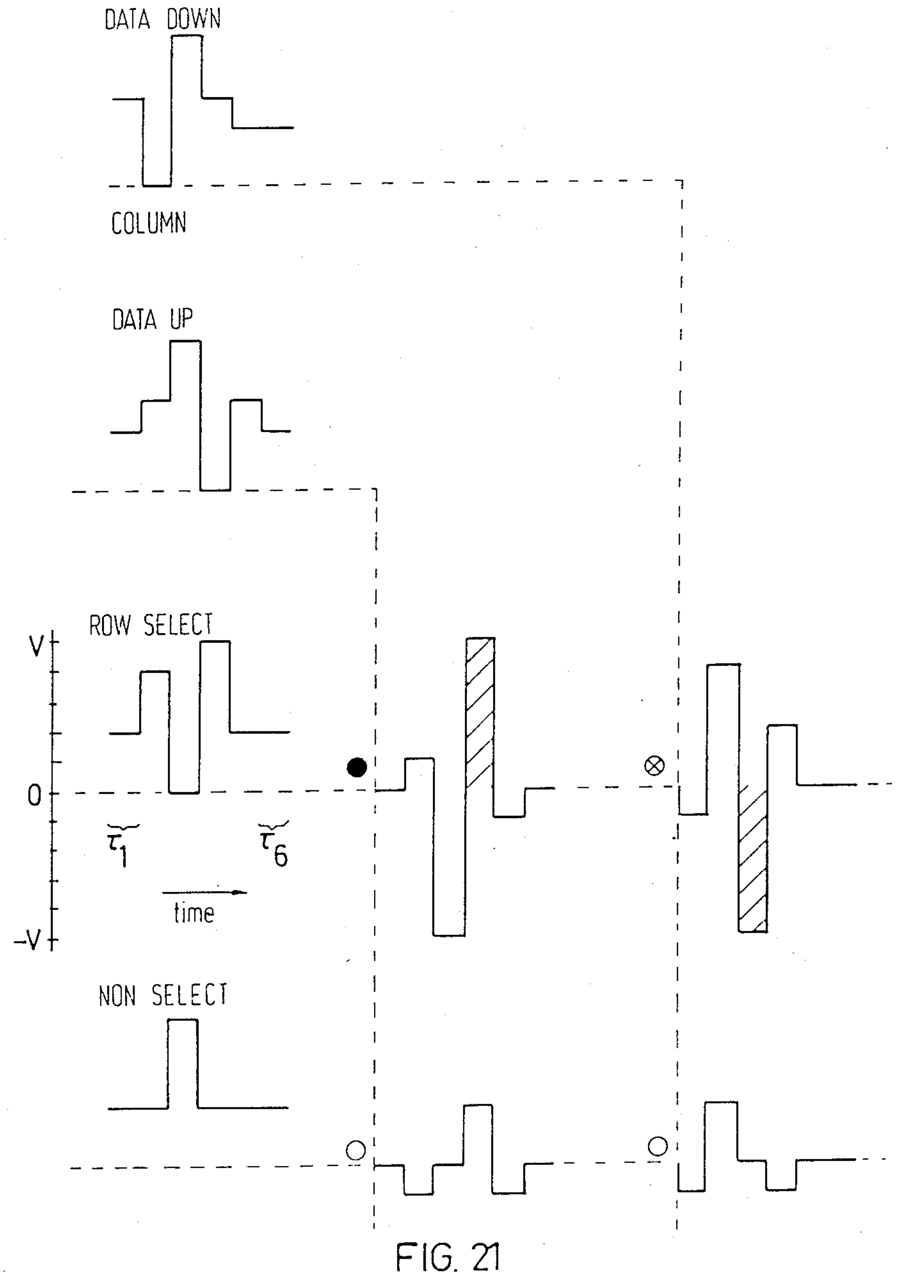

FIGS. 20 and 21 show examples of driving schemes for compensation of primarily asymmetric switching properties.

FUNDAMENTAL CONDITIONS

Tilted smectic liquid crystals built from chiral molecules are ferroelectric as originally described by R. B. Meyer et al in their article of Journal de Physique 1975, Volume 36, page L 69. Hence these ferroelectric liquid crystals (FLC) offer the possibility of a linear and, in most circumstances, much stronger coupling with an external electric field than that based on the quadratic dielectric effect always present in liquid crystals due to their anisotropic properties. The simplest and so far the most common ferroelectric smectic is the chiral smectic C phase which in the general practical case is a balanced multicomponent mixture of different chiral and non-chiral mesogenic molecules and of chiral, polar and viscosity-depressing dopants. In this medium, denoted C*, the molecular director $\hat{n}$ (being roughly equivalent to the optic bi-axis or, more properly, to the average direction of the two optic axes) tilts away from the smectic layer normal by an angle $\theta$, and the local polarization $\vec{P}$ is everywhere perpendicular to the director. Similar but more highly ordered ferroelectric phases exist, often at a lower temperature in the same compound. The most important of these are called I*, J*, G*, and H*.

In its normal crystallographic state, the C* phase shows no ferroelectric domains; instead the dipole moments are continuously cancelled by $\vec{P}$ (and $\hat{n}$) helixing around the direction of the layer normal, in a similar way as found for the magnetization of helimagnets. In SSFLC devices, the common C* phase structure with helix (which could also be absent by compensation) is however forced out of its bulk state by surface interaction. In the applied configuration ("book-shelf geometry", smectic layers being essentially perpendicular to the boundary glass plates which are just a few microns apart) neither the helix nor any other inhomogenous ("splayed") state is formed, but instead chooses either of two surface-stabilized directions, as disclosed in U.S. Pat. No. 4,367,924.

These "spin-up" and "spin-down" directions, respectively, are preserved essentially across the whole layer between the glass plates and correspond to ferroelectric domains appearing spontaneously, i.e. without the previous action of an external field. These domains, and some analogous, more complex domains described in U.S. Pat. No. 4,563,059 (filing date July 7, 1983) are characteristic of SSFLC structures. The polarization $\bar{P}$ now follows the direction of a DC field applied across the sample, leading to an electro-optic birefringence effect, between crossed polarizers, of high contrast, and high speed (kHz to MHz range). With suitable surface treatment the switching can be bistable and can be accomplished by short pulses of about 3 to 30 volts amplitude. The effect has a certain threshold, strongly depending on cell thickness and boundary conditions.

Due to the very different nature of the physical effects employed in ferroelectric and non-ferroelectric liquid crystals, the question has been raised whether it will be possible to multiplex or matrix-address SSFLC device in a similar manner as can be done for some of the other liquid crystal electro-optic effects, especially without using any active devices such as thin-film transistor (TFT) and similar high-cost and size-limiting elements. No satisfactory analysis has however, yet been presented as for the basic physical requirements on such an addressing scheme, especially with respect to an optimal contrast ratio.

The preferable addressing scheme has to take account of and support the most unique and valuable property of the SSFLC geometry, (except the speed), namely the bistability. This property is extremely sensitive to choice of materials and surface treatment and has been discussed in several articles like Clark et al, Mol. Cryst. Liq. Cryst. 1983, Volume 94, page 213, Lagerwall et al, Mol. Cryst. Liq. Cryst. 1984, Volume 114, page 151, Handschy et al, Ferroelectrics 1984, Volume 59, page 69, and Wahl et al, Ferroelectrics 1984, Volume 59, page 161. It is clear that a good, and especially symmetric, bistability has dramatic positive consequences for the multiplexibility of SSFLC devices. A slight asymmetry may always be present in practice and can even be advantageous. The asymmetry in back and forth switching can be accounted for by proper driving techniques as will be discussed later on.

BASIC SWITCHING CHARACTERISTICS AND CONSEQUENCES FOR ADDRESSING

Figure 1:
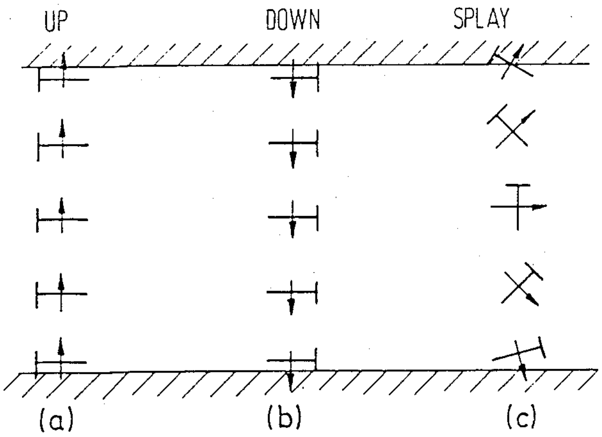
FIG. 1 is a schematic sketch showing in cross-section a ferroelectric liquid crystal configuration.
Figure 2:
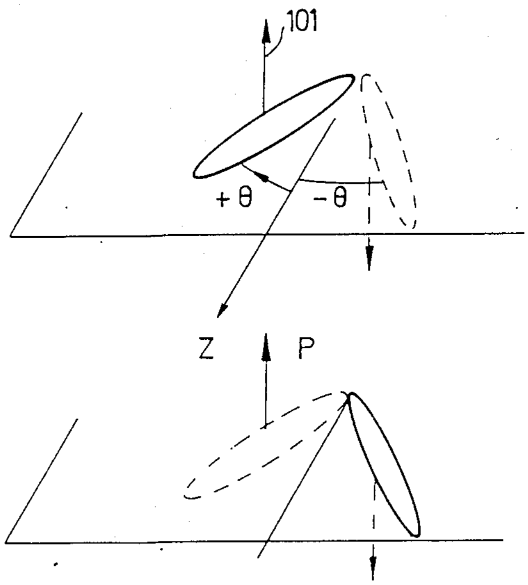
FIG. 2 shows modular orientation corresponding to FIG. 1 in a perspective view.

In FIG. 1 a simple sketch if given for a homogeneous state with polarization ("spin") UP (a) and the corresponding state (b) with polarization DOWN. In (c) is shown an example of a non-homogeneous state. The smectic layers are parallel to the plane of the paper. The molecular axes are horizontal in (a) and (b), and we use a convention of adding a hat on that end of a molecular rod that is pointing out of the paper towards the observer. The molecular position ($+\theta$ and $-\theta$) corresponding to the UP and DOWN states of FIG. 1 are visualized in FIG. 2 which instead shows the top and bottom plates in a perspective.

The switching between the UP and DOWN states shows some very characteristic features but so far very few systematic studies, if any, have been undertaken, and very few materials have been investigated outside the families of DOBAMBC or HOBACPC and similar substances. The switching time $\tau$ for the latter is sketched roughly in FIG. 3 as a function of the pulse amplitude voltage V applied across a 1.5 $\mu$m thick sample. In the following we are using the voltage V (at a certain cell thickness) as well as the corresponding electric field E, implying that the electrooptic response is basically a field effect. Two regions are immediately distinguished. In the steep low-voltage region (II) nucleation phenomena dominate with domain wall motion as an important ingredient. On increasing the field more nucleation sites will be activated, so the walls do not have to travel as far to connect up. Also, the walls move faster, altogether contributing to a roughly $E^{-2}$ dependence. When the nucleated areas have coalesced there will be a nucleation threshold for the reverse process and the switching should in principle acquire bistable properties, although the practical bistability will sensitively depend on the size of the threshold. In the high field region (I), on the other hand, the collective bulk spinflip motion takes over the dominance from surface-influenced processes and a simple linear field behaviour results, with $\tau \sim \gamma/PE$, where $\gamma$ is an effective rotational viscosity and P the polarization. The crossover voltage $V_o$ between the $V^{-2}$ and the $V^{-1}$ regions typically lies at one or at a few volts. For any particular case, $V_o$ can be expected to decrease when the density of nucleation centers is increased. It should be noted that the quantity $\tau$ in FIG. 3 does have the significance of a switching time although it is not at all defined in the conventional way used for the electro-optic response in nematic liquid crystals. Instead $\tau$ here stands for the pulse duration required to achieve bistable latching when applying a voltage V over the sample. The dynamics of the process is sketched in FIG. 4 where the optical transmission increase from the crossed polarizer extinction state is pictured in response to three different lengths of pulse activating the non-extinction state. For the two first pulses of lengths of roughly 70 and 85 per cent, respectively, of $\tau$ the optical response can be seen to increase during the time the field is applied but then relax back, whereas it latches after any pulse of duration $\pm\tau$. If the amplitude is decreased the response will be similar but slower until, at a sufficiently low voltage, $V_{DC}$, the optical response will cease altogether (region III in FIG. 3).

We may summarize the switching behaviour in the following way: It is always possible to choose a pulse height sufficiently low that no switching occurs even if the cell is activated infinitely long, i.e. there exists an absolute lower threshold. For HOBACPC, for instance, the absolute voltage threshold $|V_{DC}|$ is about 0.1 volt in the C* phase (for cell thickness of about 2 $\mu$m). If this threshold could be brought up by factor of ten it would permit the most easily conceivable matrix addressing scheme for an SSFLC device, as to be discussed in section 13. Such higher values of $|V_{DC}|$ were observed in the more highly ordered phases I*, J*, F* and G*. As an example, we found $|V_{DC}|$ to lie above 1 volt in the G* phase of HOBACPC.

When increasing the applied electric field we move into the typical region where no actual voltage threshold exists but rather a threshold value in the product of pulse height and width, i.e. there exists a critical $(V.\tau)_c$ area rather than a critical $V_c$. The threshold properties vary greatly with the liquid crystal material, the temperature, the surface conditions and the cell thickness (as valid for all field effects).

The existence of a threshold area is the most unexpected basic feature and has striking consequences for the addressing of SSFLC devices. Another important but evident feature is the polar character of the switching which means that the switching pulse is always a DC signal. However, any such DC signal local in time normally has to be compensated by pulses of opposite voltage sign so that, averaged over times $t>>\tau$, no effective DC voltage appears across any element, otherwise undesirable electrolytic effects may not be avoided. This DC compensation preferably has to be made without backswitching caused by the compensating pulses. Furthermore, the DC driving can sometimes cause charge separation in the liquid crystal host, especially in higher-conductive materials, which may reverse the active field when a sufficiently long pulse of a certain polarity is taken off. This may lead to another kind of undesired backswitching. Finally, the bistability may not be entirely symmetric (this again most sensitively depends on surface alignment conditions at the two surfaces) which can be remedied by asymmetric driving conditions, for example, by a DCoff-set voltage together with certain precautions in cell construction. To summarize, care has to be taken to consider the following characteristics.

(a) switching back and forth between states is accomplished by DC pulses of opposite sign, i.e. the switching pulse activation is polar.

(b) sensitiveness to addition of undercritical pulses; there is a threshold pulse area $(V.\tau)_c$ where V denotes the pulse amplitude and $\tau$ the corresponding pulse width.

(c) the switching time-voltage characteristics is unusual, crudely described by $\tau_c \sim |V|_c^{-a}$, with a=1 for high voltages (e.g. >5 V in HIBACPC) and a≧2 for low voltages.

(d) desirability of zero DC voltage across every picture element, i.e. zero time-averaged voltage on a sufficiently long time scale to prevent electrolytic effects.

(e) preventing of field-reversal from ionic conductivity effects.

(f) threshold symmetrization by asymmetric surface treatment or by a DC off-set voltage.

It is immediately clear that some of these issues e.g., (d) and (f), may be in conflict with each other, which requires a particularly careful discussion . If a completely symmetrical threshold is achievable or not depends on several factors, especially on the surface alignment. The threshold is normally easier to achieve in the lower-temperature phases, like I*, J*, F*, G*, than in the C* phase. In the C* phase, characterized by the highest speed and the weakest threshold conditions, the symmetric threshold is particularly sensitive and may be most easily reached by shear. Several alignment techniques suitable for large-scale manufacturing may also be used but often lead to an unsymmetric threshold. The situation is normally more favorable in the case the lower-lying highly ordered, but slower FLC-phases. Simplifying the great variety of situations, it is convenient to discuss the symmetric and nonsymmetric threshold conditions separately (section 5).

REVERSE FIELD AND ITS BACK-SWITCHING EFFECT

The detrimental effect of intrinsic field reversal was already observed in very early (DC addressing) work on liquid crystal devices, especially on those utilizing the so-called dynamic scattering effect. When DC-activated, liquid crystal materials characterized by a relatively high ionic conductivity may stay activated for a certain time even when the field has been taken off. In the ferroelectric liquid crystals the analogous effect means that some experimental mixtures immediately switch back (partially or completely) into the original state if pulses of too long duration are applied; in certain cases the cells can not be switched at all. This phenomenon, that we denote by the term "reverse switching effect" may sometimes be suppressed by opening the driving circuit immediately at the end of the switching pulse (analog switch, or tri-state driver). By this technique some of the cells could be switched with pulse durations two or three orders of magnitude shorter than with standard driving circuitry. (We will return to this point in section 12, c.). The explanation of the backswitching lies in the fact that long pulses will separate space charges, resulting in a reverse field which adds up to the depolarization field $E_D$, partially compensating the applied field E. The external charges creating E will flow away in a very short time after the steep voltage decay (relatively low driver impedance), whereas $E_D$ can stay on, especially if created during a long pulse time and in combination with a strongly overcritical applied voltage. It may then itself appear as a critical or overcritical applied voltage of opposite sign causing the molecules to switch back, at least partially, to the original state of opposite polarization. $E_D$ increases with increased pulse duration and space charge density (conductivity), hence the reverse switching is avoided by using short pulses, which is desired anyhow, together with using only high-resistivity materials.

NECESSARY AND SUFFICIENT CONDITIONS FOR THE DRIVING PULSE SEQUENCE

(a) Symmetrical Threshold Case

Ferroelectric liquid crystals may be electrically addressed in many ways, because of the basic properties of these materials and, more specifically, of the surface-stabilized ferroelectric liquid crystals, addressing schemes which do not satisfy the following conditions will be deficient in some way or another, or at least they will be far from optimized in the sense that they either do not utilize the possible inherent speed or the bistability, with reduced overall performance including contrast, as a consequence.

The first essential characteristics required for two-state switching (UP and DOWN states) are 1. The switching pulse applied across a picture element have to be polar, thus DC; they are characterized by their voltage-time product $V\tau$ of area $A_x$.

2. There exists a threshold, $A_c$, in the area rather than in the voltage, in the sense that the switching pulses must have $A_x>A_c$. For $A_x<A_c$ partial switching generally occurs but no latching into a new state. A picture element which is to switch into the opposite state is designated a selected element.

Note: the foregoing statement basically requires that the picture element has been in its initial state during a time $t>>\tau$, where $\tau$ is the pulse time. If the picture element has changed its state wholly or partially in a more recent time, the threshold to some extent depends on the preceding pulse and the statement has to be slightly modified as will be discussed in later sections.

3. The time-integrated voltage should be AC, i.e. there should be a built-in DC compensation achieved by new pulses of area $A_y$ with amplitude, pulse length and polarity chosen such as to cancel any DC bias.

4. The DC-compensating pulses preferably have to be subcritical, i.e. $A_y<A_c$, otherwise superfluous back-switching will be caused. Likewise, the subcritical pulses should never be allowed to add, e.g. by arriving adjacent in time, to the critical pulse value, i.e. $\Sigma_{adj}(A_{yi})<A_c$ should hold.

5. For all pulses a further independent but normally much less stringent limitation is required by the inherent tendency for reverse switching. In practice this is a weak constraint leading to a limitation in pulse length, influenced by the resistivity of the sample. The use of long unipolar pulses requires therefore a high resistivity, which is anyhow a desirable property in any liquid crystal material to be applied in practical devices.

In addition to these requirements, which are sufficient if fulfilled simultaneously, and at all times on a macroscopic time scale, across every picture element, at direct drive as well as at matrix addressing, there are some desirable characteristics that cannot be fulfilled independently and for which thus an optimization has to be looked for, chosen in regard of each individual application. The most important of these further requirements are:

6. Whereas $A_x$ in 1. may be desired as high as possible relative to $A_c$, any sum of adjacent subcritical pulses $\Sigma_{adj}(A_{yi})$ should be kept as low as possible to make a high selection ratio. With selection ratio we mean the ratio of any overcritical switching pulse area to any subcritical non switching pulse area, both of either positive or negative sign, excluding a switching or non switching DC compensation pulse area immediately in front of a switching pulse area.

7. Requirements 1-6 ought to be fulfilled also in situations where, for instance, a pulse height or width modulation is superimposed. This may not be possible without reducing the selection ratio.

8. Although the requirement 3 is quite basic, it can sometimes be advantageous not to fulfill it strictly but to work with a slight DC off-set, in order to compensate for a given asymmetry in the two switching states. Any DC off-set requires, however, special care and will be discussed further below.

(b) Asymmetrical Threshold Case

SSFLC cells often show an asymmetric switching behaviour in different respects. This normally requires an adjustment of the addressing scheme without, however, altering the general principles. For instance, the pulse areas $(V\tau)_c$ characteristic for latching into the UP and DOWN states may be different, or there will be no threshold in one of the states, as in a monostable device. As repeatedly pointed out, this is very sensitive to the proper choice of surface treatment with regard to the ferroelectric liquid crystal. One of the main reasons for the asymmetry is the polar coupling of the FLC molecules to the confining boundary, which is illustrated in FIG. 1*a* where the local polarization points into the liquid crystal at the lower surface and toward the boundary at the upper surface. This asymmetry can be made smaller by a compensating asymmetry in the surface treatment (cf. FIG. 2). A remaining part, or even the whole part, can be compensated by asymmetric driving. In practice one may very well operate a monostable device too, of only the relaxation times are sufficiently long, e.g. much longer than the frame addressing time of a matrix. We discuss this in sections 11 and 13 where some corresponding embodiments are presented.

METHODS AND EMBODIMENTS FOR STATIC DRIVE

In the "static" drive mode, which can conveniently be used for one pixel, a simple linear array and a matrix with individually addressed pixels (such a matrix could either be small and with low resolution or, more interestingly, lie at the other extreme, as for instance a giant high resolution display board with the single pixels big enough that no mechanic-geometric problems exist for their individual addressing) a device element is in general switched between its (two) stable states by applying short positive and/or negative voltage pulses to both of its electrodes, so that the voltage difference V appearing during the pulse duration $\tau$ across the electrode overlap area fulfils the condition $V\tau>(V\tau)_c$ where $(V\tau)_c$ as before is the minimum pulse area for latching into one of the bistable states. Especially one may connect the electrode to ground and apply positive and negative pulses to the other in order to switch back and forth, or one may to both electrodes apply unipolar pulses which are shifted in time. As a convention, we apply a "data" signal to one of the electrodes (e.g. the front plane, or a column in a matrix) and a "common" signal to the other electrode (e.g. the back plane, or a row in a matrix). The voltage difference between the electrodes is taken as V(common)−V(data) in the following descriptions.

For static drive there are no severe addressing problems because the selection ratio is virtually infinite. In principle a pixel is only addressed when its state should change into the opposite one. For screens with quasi-static information or with a statistical alternation of UP and DOWN states at every pixel DC compensation will not be necessary, but if desired one may prevent repeated addressing with the same data signal (pulse), which would lead to accumulation of unipolar pulses, by applying some additional electronic circuitry as will now be discussed.

Figure 5:
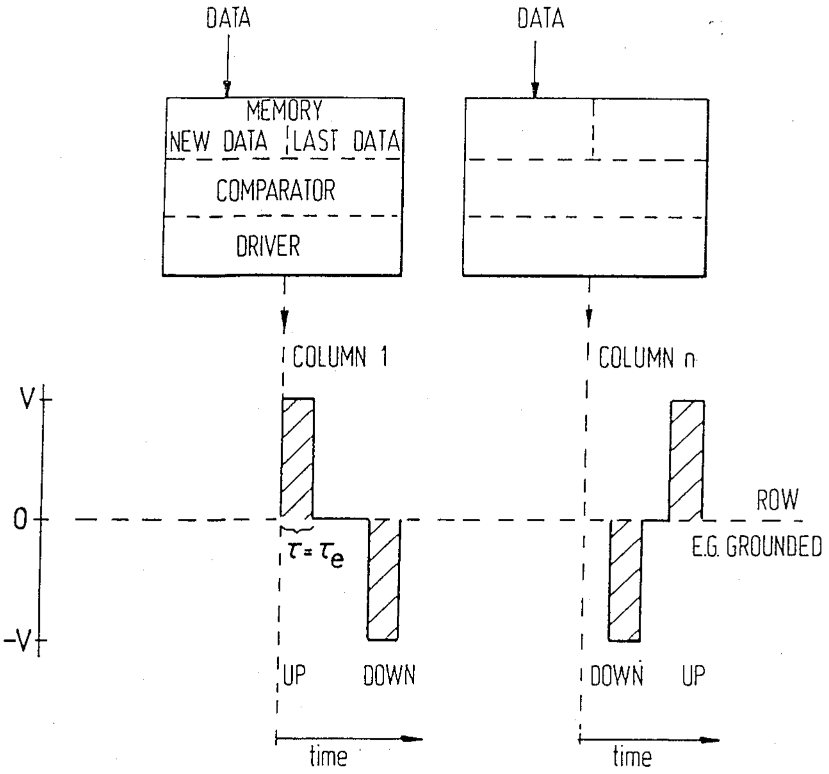
FIGS. 5 and 6 illustrate basic polar driving of one pixel or linear array devices.

As a first embodiment of our SSFLC-driving techniques we apply the static method to a linear array consisting of one row (common electrode) and $m>1$ columns (data electrodes), as shown in FIG. 5. Here, the row is connected to ground and each column is connected to an electronic circuitry which comprises different functional sections as indicated in the block diagram. FIG. 5 shows an example of waveforms which may appear across a pixel. The actual data signal for the UP and DOWN state, respectively, is always stored, and when a new data signal arrives, it will be compared to the preceding one. If the two signals are identical a column driver will not release any pulse (ground voltage level). Otherwise, a positive or negative pulse is applied to a column according to the intended change of the state of the related pixel. Thus, we use internally three different data signals for the columns, one for switching up, one for switching down and one for no change.

Figure 6:
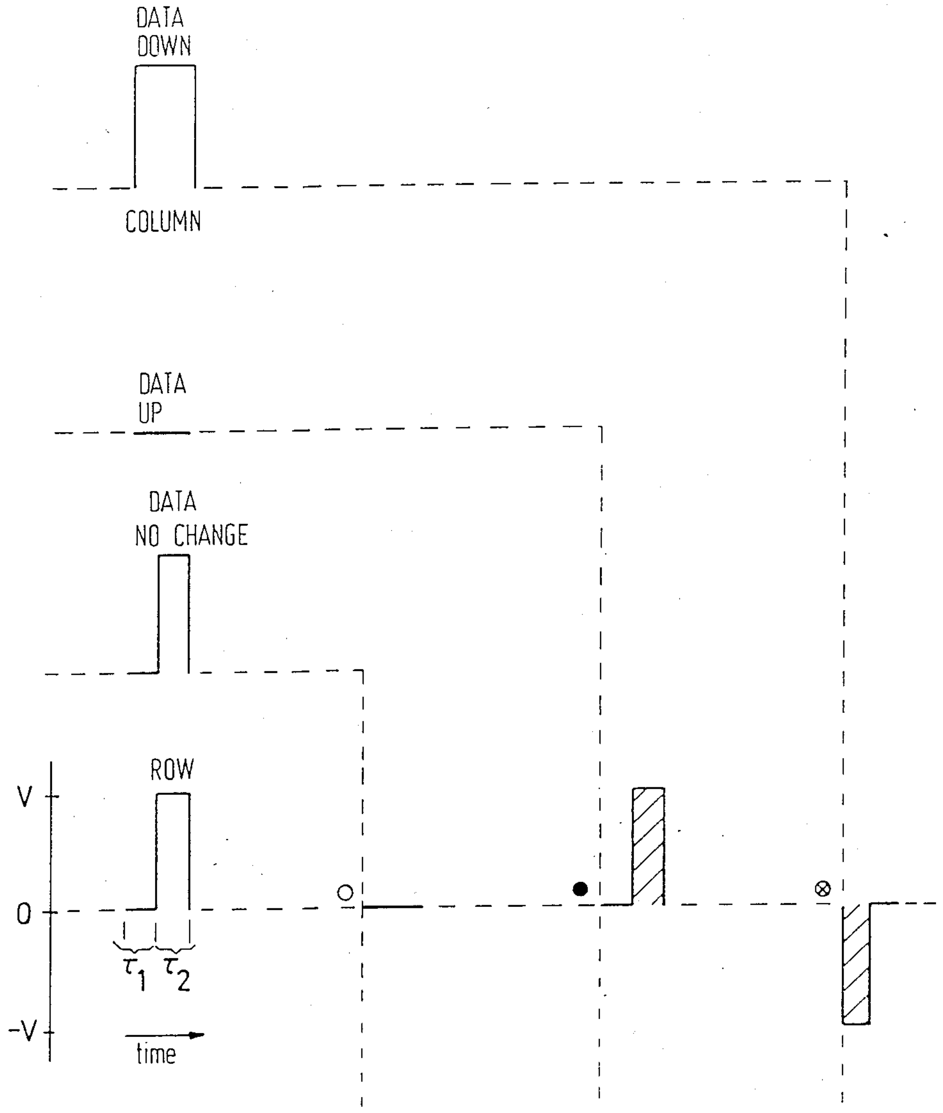

In FIG. 6 we show an example of the time sequence of the actual pulses applied to some columns of a linear array, now using only unipolar (positive) pulses, together with the pulse sequences resulting on the related pixels. For the sake of convenience we here and in the following arbitrarily identify up and down switching with a positive or a negative pulse, respectively. In this driving scheme, the total addressing time $\tau_c$ of a pixel is twice the time $\tau$ needed for latching into a new bistable state at the applied voltage V. This is twice the time needed in the preceding example, but in that case we had to apply positive and negative pulses, i.e. twice the voltage V.

Figure 7:
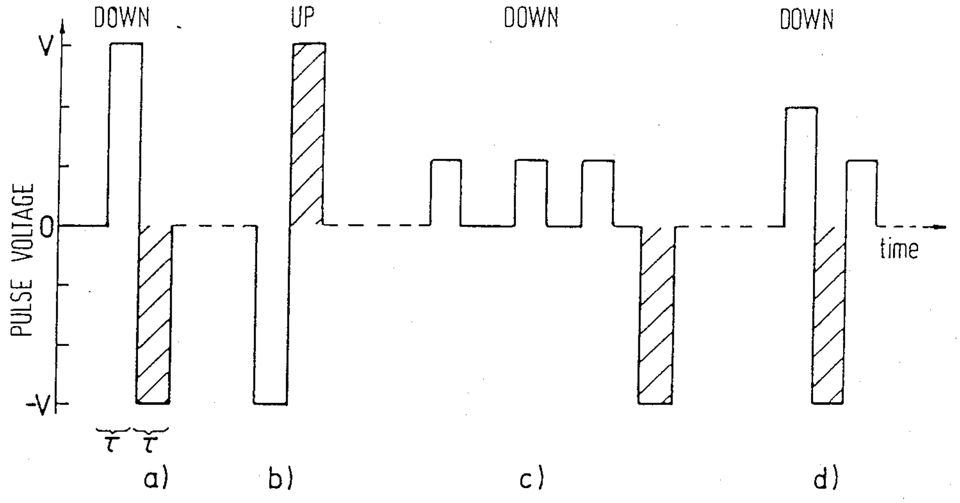
FIG. 7 shows several examples of DC compensated switching waveforms.

In many applications one might not want to use, or it is not necessary to use, any extra memory and comparator electronics to prevent accumulation of switching pulses of the same polarity (DC-bias). Such accumulation can instead be prevented by combining every switching pulse with one or more properly chosen compensating pulses of opposite polarity and integrated ($V\tau$) area equal to that of the switching pulse. A first consequence of this compensation is that the total time $\tau_e$ of addressing gets longer. In general $\tau_e$ is chosen to be a multiple of $\tau$, i.e. $\tau_e = n\tau_1$ but this is not necessary. FIG. 7 shows some examples of this kind of DC compensation. Part (a) and (b) illustrate compensation with only one pulse of opposite polarity, located immediately in front of the switching pulse. It is obvious that in this bipolar pulse shape ($\pm V$) of duration $2\tau$, the last (shadowed) pulse defines the final state of a device element, whereas the leading pulse can, depending on the prior state, force the addressed pixel intermediately into the opposite state. This may lead to a decrease in contrast if the repetition rate of addressing the same electro-optic element is too high. Nevertheless in cases like a matrix with a large number of scanning lines (rows) the unintended intermediate switching will not have a significant influence on the contrast.

Applying an equivalent number of small, undercritical compensation pulses, one can avoid intermediate switching, but the effective addressing time increases, as stated above. Two examples of appropriate waveforms across a pixel are shown in FIG. 7(*c*) and (*d*) for the case of down switching. It is very important to separate succeeding (undercritical) compensating pulses from each other (as in FIG. 7(*c*) by a sufficiently long time interval in order not to critically activate the ferroelectric element.

An example of a simple scheme for static drive is shown in FIG. 8, where we use a one pulse DC compensation and only unipolar (positive) electrode signals. We see that the minimum addressing time of the scheme is $\tau_c = 3\tau$. Such a scheme is easily applied to one-pixel or linear array devices.

MULTIPLEX DRIVE

Figure 3:
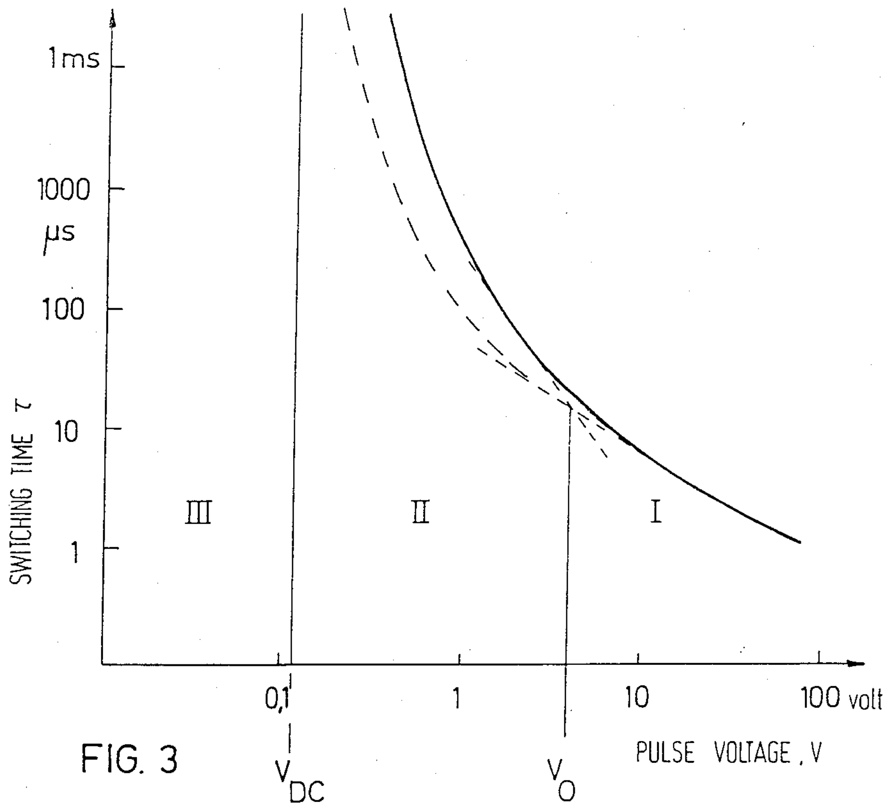
FIG. 3 is a diagram demonstrating typical time-voltage dependence of switching in ferroelectric liquid crystals.
Figure 4:
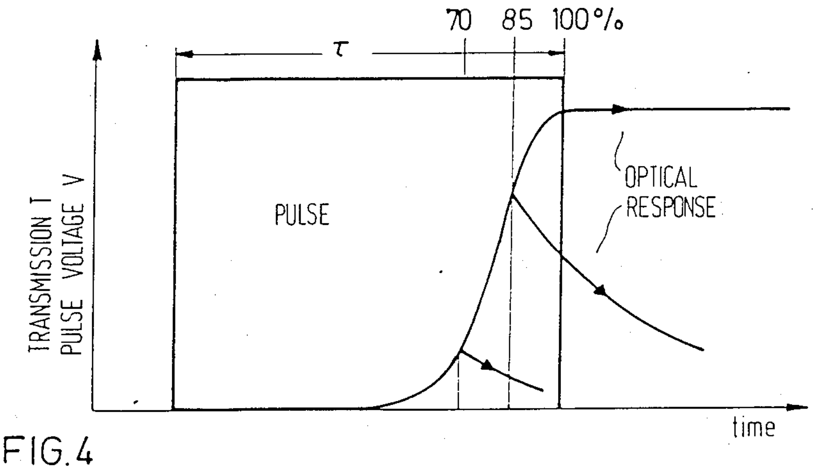
FIG. 4 shows the optical response for electrical pulses of different duration.

To people skilled in the art it was immediately clear that ferroelectric liquid crystal devices cannot be multiplexed according to the same principles that are valid and now well-known for twisted nematic devices. Doubt was early cast on the question whether SSFLC devices could be multiplexed at all without using active elements like transistors and diodes, at least one for every pixel. Active matrix addressing methods have also been proposed, e.g. in European Patent Application 01 46 231 (International Standard Electric Corporation, filing date Oct. 18, 1984). It was in particular commonly expressed that due to the only weakly non-linear $\tau$—V dependence as expressed in FIG. 3, multiplexing an SSFLC matrix would lead to a considerable crosstalk between adjacent pixels. As we found in our analysis and as has been borne out by testing our driving schemes, this is, however, not at all the case. On the contrary, the freedom of crosstalk is striking. To make clear the reason for this we point out that the schemes work with quite high selection ratios and that $\tau$ from FIG. 3 is not a conventional response time but a latching time. Thus for pulses with constant width of, say, $\tau_1$ there is a voltage threshold $V_1$, and this threshold can be quite sharp.

The actual multiplex driving schemes are presented and discussed in section 11. Apart from obeying the principles formulated is section 5, as they generally do, as for instance that an overall DC compensation is always builtin, and that precautions have been taken against reverse switching, the following three goals must be considered as having the highest level of priority for any practical device circuitry. The degree of their fulfilment is thus a goodness or quality criterion.

(i) A low effective line (and frame) addressing time.

(ii) A high selection ratio of switching and non switching pulse areas with respect to high contrast and large viewing angles in case of display devices.

(iii) Whereas for the switching itself the RC value should be as small as possible, as soon as the switching has been performed the external driving circuitry impedance should be made as high as possible in order to prevent decharging and keep as high optical contrast as possible on the device.

A COMPARISON: DRIVING OF SSFLC-AND TN-DEVICES

The biggest advantages of the SSFLC-cell are the bistability together with a sharp threshold and the very fast response times. Especially in cases with static drive and low rate of data change the power consumption can therefore be much lower than that of usual TN-cells, which must be permanently activated by ac voltages. As an example, one may only consider the operation of an hour or calendar digit in a clock display.

Contrary to (passive) TN-devices, the number of scanning electrode lines in multiplex drive is nearly unlimited for SSFLC-devices due to a nearly constant selection ratio. (This ratio is assumed to lie effectively between 2:1 and 3:1, whereas the corresponding ratio for TN-devices decreases with the multiplexing factor and is, for instance, only 1, 11:1 for multiplexing ratio 100. Six or more voltage levels are commonly applied for high multiplexing ratio TN-addressing. Moreover, TN-cells require increasing battery voltage with increasing multiplexing ratio (at constant threshold voltage). SSFLC-cells can easily be operated at constant voltage, e.g. in the usual CMOS range between 5 to 15 volts. On the whole, the SSFLC multiplex technology of the invention reduces the expenditure of driving electronics, which should result in lower systems costs.

DIELECTRIC TORQUES, AC AND DC STABILIZATION

Apart from ferroelectric torques there are always dielectric torques acting on the molecules. If these have a negative $\Delta\epsilon$ value the planar arrangement is supported, with a number of valuable consequences: the threshold becomes more pregnant and the bistability increases. One could take advantage of this by applying an extra, "stabilizing" AC field across the glassplates. It can be noted however that this kind of stabilization, with undercritical pulses, is already an inherent feature of every DC compensated driving scheme, and it can easily be checked that all here stated addressing modes have a stabilizing effect of OFF and ON states for materials with negative dielectric anisotropy. The inevitable "crosstalk" or undercritical (cf. section 11) pulses on every pixel of the matrix then help to stabilize the two switching states, thanks to the sign of the dielectric torque (rms behaviour). The AC stabilization can easily be enhanced e.g. by increasing the pulse frequency on the non selected rows. This will be illustrated in later sections.

In SSFLC cells with asymmetric or even monostable switching characteristics a very different and in most cases far more elegant "DC" stabilization can be performed. Application of a small dc bias of proper polarity will in such a case enhance the bistability with only a small loss of contrast. This of course violates the above requirement of zero dc voltage in order to prevent electrolytic effects. But a certain dc level will be tolerable, as we have also tested in long-term experiments if we care for proper insulating layers on the cell boundaries. In fact, common admitted long-term DC values today may amount to 0.1 volts for commercial TN displays, and this level is in many cases satisfactory for DC stabilization. AC and DC stabilization are compared in FIG. 9 where a schematic drawing shows the free energy in a more or less monostable switching situation (full line) and in a symmetrically bistable (dotted line) obtained either by properly treated boundaries and/or with a bias field. The AC stabilization means a superposition of an essentially symmetric dielectric torque, DC stabilization of an essentially asymmetric ferroelectric torque. We will return to these techniques in section 11.

GREY LEVEL AND MULTI-COLOUR SWITCHING

Referring to the basic and electrical properties of the SSFLC-cell discussed in the previous sections, we now finally comment on some methods for displaying different grey levels and/or colours before entering on practical driving embodiments.

(a) Raster Technique (space integration)

Like e.g. in conventional newspaper print one may use in the first place additive mixing of the optical states of neighbouring pixels. In very thin cells with negligible eigen colour one may integrate a redgreen-blue colour filter as is currently available for TFT addressed TN-matrices. One may also use defined birefringent colours which can be contained by preparing a cell with a stepwise varying layer thickness, of particular interest for a reflection device of high brightness. Due to the field threshold different colours then need different values of $V_T$ and can be arranged to a repeated three-colour pattern, controlled by selective addressing. A simple matrix addressing scheme is discussed in part c) below.

A disadvantage of the raster technique is that it requires an increased pixel density. It should only be mentioned here, that a gain in resolution can be obtained by applying proper digital data processing, e.g. by the binary grey scale technique (see below). Ideally one would require one pixel to display different grey levels or colours. To a rather limited extent this is possible with one of the following methods.

(b) Switching with different duty ratio (time integration)

Due to the fast response of FLC's one may permanently switch a display element with an adjustable ratio of the on and off time, where the frequency has to be high enough to avoid flickering. This method is easily applied to cases with "static" drive, but requires a large amount of extra electronics for data processing and storage especially in case of video rate high resolution matrices. A general disadvantage of this time integrated switching is the increased power consumption.

(c) Multistate switching.

As has been earlier discussed in detail (U.S. Pat. No. 4,563,059; filing date July 8, 1983), one may under certain conditions obtain more than two switching states, especially in the more highly ordered ferroelectric smectic phases. The additional states are partially stable without a holding field and also exhibit a threshold switching characteristic. In consequence a display element may be switched between different optical states by applying pulses with different $V_T$. Driving is trivial in case of one pixel and linear array devices. For multiplex drive the different thresholds have to lie sufficiently close together with respect to the overall selection ratio. In the simplest case one may use one of the matrix addressing schemes discussed below and modulate the switching and compensation pulses either in width or in amplitude as will be illustrated. It should be noted that this procedure reduces the effective selection ratio.

(c) Partial spatial in switching (space integration)

With certain cell preparation (see below) one can obtain a texture which from macroscopic sight shows an optically uniform appearance but has a multidomain, fine grained structure when viewed under magnification. Such a texture exhibits excellent bistability with a strongly enhanced remanence due to the defects and domain walls. The grainy structure somewhat reduces the overall maximum achievable contrast but one has the advantage of displaying several grey levels, which are generally stable also in the absence of a driving field. If one modulates the pulse area $V_T$ around the threshold value for the ideal SSFLC-structure, one may switch a larger or smaller number of domains within one pixel. Space integration results, as in method (a), in different grey levels but with the advantage of higher resolution. The grainy structure was obtained in thin cells as with polyimide surface coating being microscopically structured by photolithography or being rubbed under different conditions or with a rough boundary surface itself, leading to a locally varying $V_c$ and a large number of nucleation sites.

METHODS AND EMBODIMENTS FOR MULTIPLEX DRIVE

Based on the above discussion of the response properties, we present in the following several embodiments of a driving scheme for one line at a time addressing of both the up and down states. All versions satisfy the stated requirements but have different properties useful in special connections.

FIGS. 10, 11, 12 and 13 show the row and column voltage waveforms as well as their differences appearing at the crosspoints (picture elements or pixels). The continuous waveforms ar one pixel during scanning the matrix are easily obtained by linking the depicted selected and nonselected pulse sequences, as demonstrated for the embodiment of FIG. 11.

In the multiplex drive any element receives a varying voltage signal which is, at any time, the difference between the signal applied to the row question and that signal simultaneously applied to the corresponding column. The row and column signals can each be one of two waveforms of duration $\tau_e$, We designate the row signals by "0" and "1" ("non selected" and "selected", respectively), the column signals by "+" and "−" ("up" and "down"). Whereas the combinations (0)−(+) and (0)−(−) do not provoke any change of state of the pixel, the combinations (1)−(+) and (1)−(−) provoke switching into the UP and DOWN states, respectively.

The matrix is scanned sequentially which means that the signal (1), also called the writing or common signal, is applied in turn to every line. During the rest of the frame time (which is thus $N\tau_e$ for a matrix of N scanning lines) the line is connected to the (0) signal and is said to be non-select. Every non-select pixel is exposed to the data signal ( (+) or (−) ) being put on the corresponding column. The resulting waveform must not contain pulses powerful enough to switch the pixel from one state to the other but only consist of undercritical pulses, which are called—because of their potentially negative influence on the optical contrast—"crosstalk pulses". By definition, there will then be crosstalk pulses present also on select pixels, i.e. in the process of writing a line, every single pulse (part of a pulse train) that is too small to induce switching is to be considered a crosstalk pulse. With the latching time as a unit, the addressing time $\tau_e$ is a multiple, $\tau_e=n\tau$, consisting of discrete in the simplest case equally long voltage phase pulses denoted by $\tau_1, \tau_2 \ldots \tau_n$. In general, an addressing (also writing or scan) pulse train consists of a switching pulse X and a related compensating pulse X', one or more crosstalk pulses $Y_j$ and their related compensation pulses $Y_i'$ and one or more zero-phases $O_i$, cf. FIG. 10. Generally, a distinction between $Y_i'$ and $Y_j$ is not relevant.

(a) Driving Schemes with One-Pulse Compensation

Figure 10:
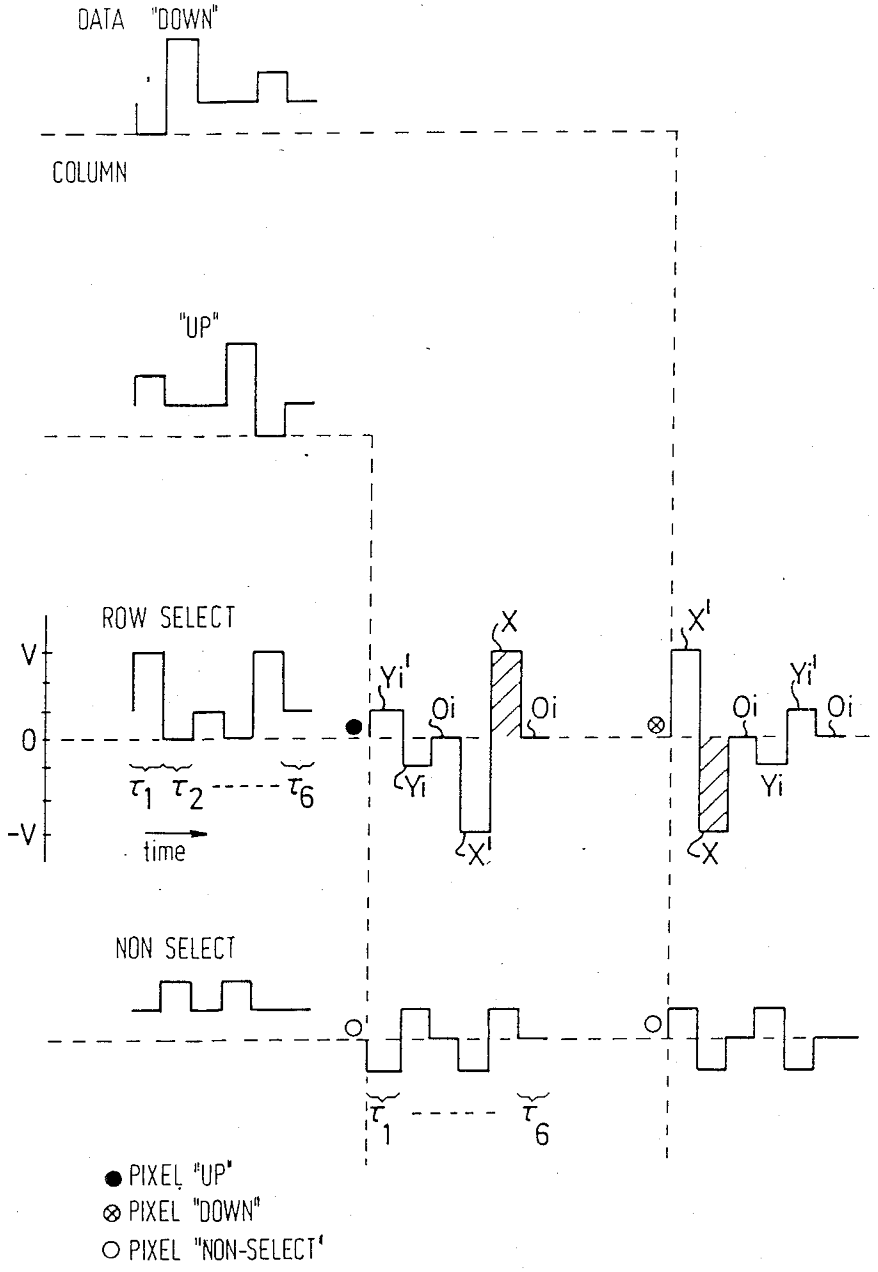

FIG. 10 illustrates the principle aspects of the driving methods of the present invention. The selected pixels in the upper row are switched by voltage pulses X of amplitude $V>V_c$ into the "up"- and "down"-state, during the phases $\tau_5$ and $\tau_2$, respectively. The corresponding compensating pulses to X, X', lie in the phases $\tau_4$ and $\tau_1$. The scheme uses a one pulse dc-compensation for switching and crosstalk pulses in order to keep the total row addressing time $\tau_e$ short. Of course similar schemes can easily be set up with several subcritical compensation pulses as in FIG. 7*c, d*, as will be shown further below.

The bipolar switching cycles are shifted in time in order to obtain low crosstalk pulse ($Y_j$, $Y_j'$) amplitudes across pixels on non-selected lines and thereby to obtain a high effective selection ratio. On the other hand this shifting gives crosstalk pulses also in the pulse trains across selected pixels. As a result, the minimum duration of a pulse train for one line at a time addressing is $\tau_e=4\tau$. Our driving schemes also contain suitable placed zero voltage phases $0_j$ which can be used to optimize the switching behaviour. Their main purpose is to prevent undesired full or partial switching which can arise from accumulation of preceding undercritical (crosstalk) pulses $Y_j$ and $Y_j'$ of the same polarity, especially in not very uniformly aligned cells (local variation of the threshold pulse area). Such a separating function is represented by $\tau_6$ in the addressing scheme of FIG. 10. It prevents e.g. accumulation of two positive crosstalk pulses when passing from the selected to the non-selected pulse train of the down state. This separating method is also explicitely shown in FIG. 11 to be discussed below. In the sated example the zero phase is not absolutely necessary, because the composite crosstalk pulse stays undercritical. On the other hand it does ameliorate the selection ratio. In other cases it might be convenient or practically even necessary to apply more than one separating zero phase.

In a different embodiment the zero phase $\tau_3$ in FIG. 10 can also be left out, with the advantage that the total, non interspaced, pulse area for switching into the down state becomes larger, thus favouring down-switching. This property of our method may be used to compensate a somewhat asymmetric switching behaviour often observed in SSFLC-cells. It is obvious that also "up"-switching can be favoured in an analogous way.

At constant pulse width unit, we define the selection ratio as the ratio of select and non-select pulse amplitude ($V_s/V_{ns}$). The best overall voltage selection ratio offered is 3:1. This means that the inevitable crosstalk pulses can be kept one third of the switching pulse, whose amplitude should be as large as the battery voltage $V_B$. For optimizing the effective switching selection ratio one should choose the subcritical crosstalk pulse amplitudes below and the switching pulse amplitude above the crossover voltage $V_o(>V_c)$. This can in general be done by properly adjusting the pulse width. The selection ratio (in the conventional sense) is assumed to lie effectively between 2:1 and 3:1.

The waveform across a pixel is generated as usual as the voltage difference of suitable row and column waveforms, whereby different waveform pairs can lead to the same result as seen by the pixel.

Figure 11:
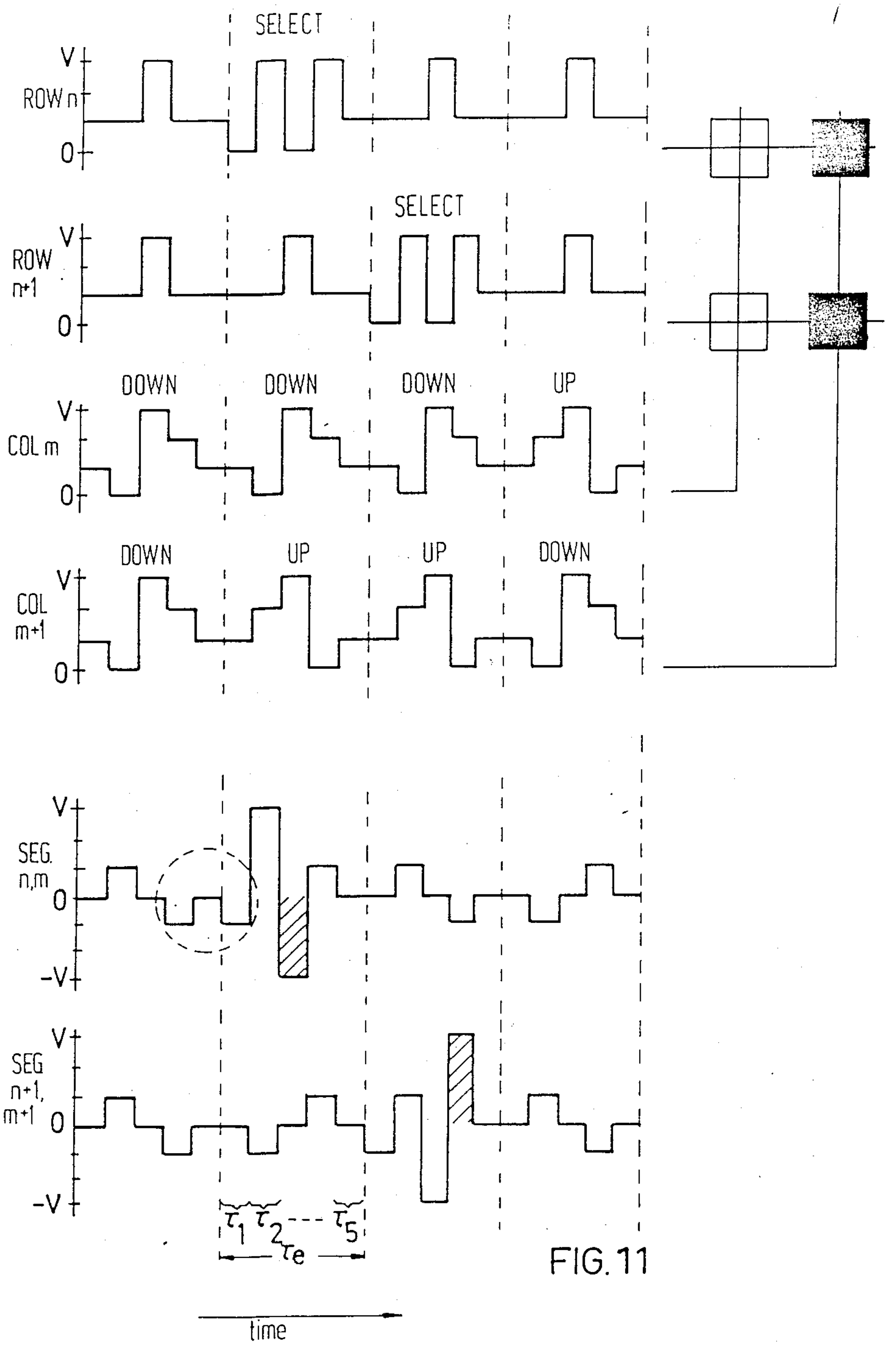

FIG. 11 shows in detail another typical driving scheme of the present invention. Here we have depicted a sequence of pulse trains in order to illustrate the connection of selected and non-selected waveforms. In this scheme, the "down"-switching pulse of the "up"-switching pulse coincide with respect to their position ($\tau_3$) in their pulse trains. Compared to the driving scheme in FIG. 10 we now have only two crosstalk pulses (instead of four) on the non-selected picture elements. This is favourable for minimizing power consumption, especially in the case of big matrices.

In a variation of the driving scheme in FIG. 11 one may leave out the zero phase $\tau_5$ in order to reduce the addressing time (n=4). As one can see, this would lead to an accumulation of two small crosstalk pulses only in the circled time period. But the combined area is still undercritical, especially if the amplitude is below $V_o$. Even if the combined area would cause some partial switching, this will not effect the contrast significantly in case of a large number of scanning lines, because it closely precedes the switching pulse. (The frame time is long compared to $\tau_e$). On the contrary, one might in still another version of this addressing scheme insert one or more zero voltage phases $0_i$ between $\tau_3$ and $\tau_4$ in order to separate the "down" switching pulse from the following crosstalk of opposite polarity. This might be favourable in case of ferroelectric mixtures of relatively high conductivity in order to damp a tendency to reverse switching.

On the other hand, a properly favoured reverse switching tendency can support the desired switching. In our deriving method this is automatically done by the large compensating pulse in front of the switching pulse. One can of course damp such a possible effect, again by inserting a zero voltage phase between the compensating and switching pulses.

(b) Driving Schemes with Undercritical Compensation Pulses

Figure 13:
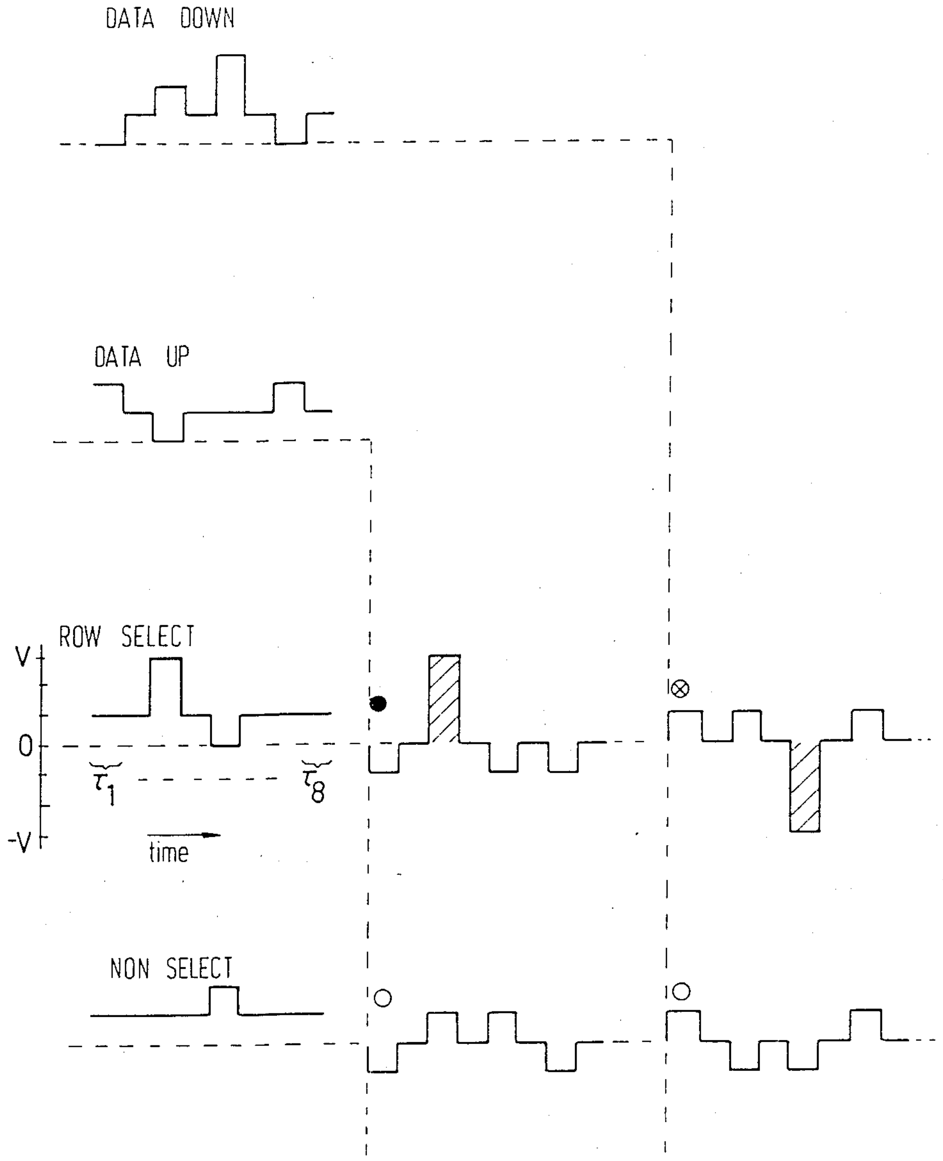

FIGS. 12 and 13 show examples of driving schemes with undercritical compensation pulses (⅓V and ⅔V, respectively). This prevents a possible intermediates switching in front of the main switching pulse and therefore should slightly increase the overall contrast. On the other hand, the total line addressing time ($\tau_e$) is increased.

FIG. 12 shows a scheme which uses V/3 and ⅔V compensation pulses. With $\tau_e$ here equal to $6\tau$ one can prevent accumulation of succeeding pulses of the same polarity using properly inserted zero phases. In another embodiment of FIG. 12 one may leave out the zero phase $\tau_3$. In this case the pulses with V/3 and 2V/3 in front of the "down"-switching pulse add up which may lead to partial switching.

Similarly, FIG. 13 shows a scheme with only V/3 compensation (and crosstalk) pulses and with $\tau_e=8\tau$.

(c) Driving with AC Stabilization

The driving schemes of FIGS. 10 and 11 differ in a further aspect not yet discussed. The effective pulse frequency and thereby the rms voltage (within the pulse sequence time $\tau_e$) are different. If power requirements are not relevant, one may choose the driving scheme as in FIG. 10 with higher frequency and higher effective (rms) voltage on the non-selected pixels in order to enhance the ac-stabilization due to dielectric torques. In another embodiment of our driving method this frequency and/or voltage can be further increased in a very simple way, namely by symmetrically subdividing each voltage pulse (and zero phase) of the non-selected row waveform at constant positive and negative area sums. This method retains overall dc-compensation and can be applied to all driving schemes being subject to this invention. An example is shown in FIG. 14 for the driving scheme of FIG. 10. Here we have used $\tau/2$ as a new time unit on the non-selected lines, but one may equally well use $\tau/4$, $\tau/6$ and so on. Furthermore, the "modulation"-amplitude (here V/3) can be chosen according to the principal driving features outlined in this invention. It is seen that now crosstalk pulses with e.g. twice the original amplitude appear on the pixels, but this is not critical with respect to ferroelectric switching because of the smaller pulse width.

(d) Driving with DC Stabilization

A stabilizing overall DC-bias can be easily obtained in our driving schemes e.g. by biasing at least one of the voltage levels of the row or of the column waveforms, so that especially on non-selected pixels the sum of the positive and negative compensation or crosstalk pulses does not longer vanish within the addressing period $\tau_e$. If only a small DC-bias on non-selected pixels is required, one may retain full DC-compensation within the frame addressing time by placing one or a few large pulses of equivalent area and opposite polarity immediately in front of the selected "up" and "down" pulse sequences.

(e) Grey Scale Driving

In another version of our driving scheme one can also display certain grey levels or different colours in combination with proper cell conditions discussed above in section 10. For this purpose one symmetrically modulates the switching pulse and the related compensation pulse, in width and/or in height. Two examples of these methods are shown in FIG. 15*a, b,* applied to the driving scheme in FIG. 10. For the sake of simplicity we have indicated only two steps of modulation for each case. The modulation of the pulse width ($\tau'$) can be performed at different voltage levels as indicated in FIG. 15*b*. The choice has to be made according to the switching characteristics. In principle every symmetrical modulation is allowed, with the constraint, that the ratio of selected and non-selected pulse area remains sufficiently above 1. In practice the switching pulse are has to be modulated around $V_c$, strictly speaking in the transition range of the corresponding threshold curve (see FIG. 3). It has already been mentioned that the slope of this curve can be decreased for displaying several grey levels by proper surface treatment. In case of a sufficiently small number of scanning lines one may alternatively generate a grey scale by very fast scanning with a selected duty ratio of the "up" and "down"-state display time, as discussed above (time integration).

DRIVING METHODS AND EMBODIMENTS WITH SELECTIVE SWITCHING.

We now present some dedicated techniques for saving power, for reducing the addressing or the effective frame time and/or improving the contrast of liquid crystal devices with an inherent storage capability. They will therefore be especially applicable to SSFLC-devices and the examples discussed below are related to their specific driving characteristics. Other types of bistable liquid crystal devices may be driven analogeously.

(a) Selective Scanning

The normal procedure of driving a matrix device is to successively scan or select one electrode line after the other out of a set of electrodes (e.g. the rows) and simultaneously apply appropriate data signals to each electrode line in a second set of counter electrodes (e.g. the columns). This is indicated as method 1 in FIG. 16.

For many applications it is in principle not necessary to scan the whole matrix at all times, for instance when there is a change of data in a small part of the matrix only. An example is a display for a typewriter or a wordprocessor where one letter after the other is written in one line of text, i.e. there will be data change only on (usually) 7 to 12 row electrodes. Due to the anticipated storage capability, and applying some extra electronics, one may therefore repeatedly scan only these rows and keep the rest of the rows unselected until a next line of text will be written, and so on. It is obvious that all of our matrix driving schemes can be applied with this method of scanning. Such an embodiment of selective scanning is labelled in FIG. 16 as method 11. We point out again that the overall contrast improves with such an embodiment of multiplex drive, especially when applying schemes with a one pulse compensation.

(b) Selective Driving (Columns)

One can also improve the overall (frame) contrast if one applies switching pulses only to those pixels where the state is intended to be changed. We have already discussed the underlying principles in case of selective switching the pixels of a linear array (FIG. 5). So, with additional memory and electronics generating a third, "neutral" data pulse train for the column "no change", a matrix is easily operated. FIG. 17 shows one embodiment of the additional "no change" data pulse train, together with the pulse trains resulting across pixels on selected and nonselected rows, when using the other row and column pulse trains of the addressing scheme in FIG. 12. The row addressing time remains in this case $\tau_e=6$.

In another embodiment of our selective driving technique one may combine selective row and selective column driving in order to obtain maximum contrast and minimum effective frame addressing time. This kind of embodiment is schematically shown as method III in FIG. 16.

(c) High Impedance Switching

We have found that bistability, contrast and also the pulse width $\tau$ for latching into the bistable states can be improved by open-circuiting (which may be done by using e.g. analog switches or tri-state drivers) an SSFLC device element at the end of the switching pulse. In certain cases the pulse width for latching was found to be two to three orders of magnitude lower than without switching to high impedance. This means that also the total frame addressing time can be considerably decreased.

The principles of low/high impedance driving of a matrix (and of a linear array as well may be illustrated by FIG. 18, where row scanning is simply done by switching the rows successively from the open circuit condition to the voltage ground level (or some other constant voltage level and back to high impedance. During the time $\tau_e$ of contact to ground, switching pulses with reference to ground are applied to the column, as indicated. By this procedure crosstalk problems on non-selected lines are eliminated so that one may apply the addressing schemes for static drive discussed in chapter 6 (FIGS. 5 to 8).

So in a first embodiment of high impedance multiplex drive we purpose scanning the rows as in FIG. 18 and applying positive and negative switching pulses to the columns under the conditions of FIG. 5, i.e. preventing successive addressing of the same pixel with switching of the same polarity. In a second embodiment of this kind, the selected row is connected to low impedance and the row pulse train of FIG. 6 is applied. During that time the related column pulses are applied, where the column preferably is switched to high impedance at the end of the switching pulse, in order to prevent quick discharge through the (relative) low ohmic driver output. Analogously, in a third embodiment, the scheme with bipolar (dc-compensated) switching pulses in FIG. 8 can be applied. In further versions of this embodiment one may also use other compensating switching pulses as for instance those shown in FIG. 7.

Finally, we propose further embodiments, each based on one of the low impedance addressing schemes discussed previously (FIGS. 10 to 15; FIG. 17) or in the following chapter (FIGS. 19, 20, 21). In these embodiments we switch all of the rows simultaneously to high impedance (e.g. by applying row drivers with an "inhibit" function) once or several times during each frame time. Preferably one may switch to high impedance at the end of the frame addressing time. The length of the time which can be spent for this addressing pause is of course dependent on the desired rate of change of information. Moreover, the latching time $\tau$ of the FLC has to be sufficiently fast. In similar embodiments one may analogously switch simultaneously all rows and all columns to high impedance. The contrast of some of our matrix devices could be shown to increase by applying this intermediate high impedance time interval.

CHOICE OF DRIVING VOLTAGE LEVELS AND SPECIALLY

Adjusted Driving Schemes and Embodiments

With regard to the response characteristics in FIG. 3 one may operate a SSFLC-device in different field regions. In case of static drive one may always choose a high voltage (in the $E^{-1}$ range) in order to get fastest switching times, whereas in multiplex drive it is very important to choose the switching and non switching pulse areas or pulse voltages properly, in order to get minimum crosstalk. So if not very fast switching times or fast frame times are required we claim to choose the selected (switching) pulse amplitude V.above and the non-selected pulse amplitude $V_{ns}$below the crossover voltage $V_o$ (equal $\tau$). As we have shown, the best overall ratio $V_s/V_{ns}$ is 3. This ratio can be somewhat improved, but only locally, e.g. regarding to non-selected lines only, as will be shown below.

Crosstalk may be even more reduced by chosing $V_{ns}$ and $V_s$ in the deeper $E^{-2}$ region of FIG. 3. Furthermore, if one could succeed to increase the DC-threshold $V_{DC}$to a few volts by improving the liquid crystal material and the cell technology, one would choose $V_{ns}$ below $V_{DC}$. In this case accumulation of small pulses with amplitudes below $V_{DC}$ will no longer be a problem, so that all regarding zero voltage phases in our driving schemes can be left out, reducing the addressing time $\tau_e$. One embodiment of this kind is e.g. the driving scheme in FIG. 13, where the zero voltage phases $\tau_2$, $\tau_4$, $\tau_6$ and $\tau_8$ (across the pixels) are left out. (The row and column waveforms have to be condensed accordingly). Such an embodiment can be preferably applied when operating a SSFLC-device in the higher ordered smectic phases like I*, F*, J*, G* and H* because of their higher $V_{DC}$.

Zero voltage phases may be eventually left out also in the two cases discussed above, where $V_{ns}<V_o$, depending on FLC and cell technology, but we emphasize here again, that any accumulation of subcritical pulses during matrix scanning can considerably reduce the contrast.

If the FLC is not very well aligned, but fast enough, it may slightly react also on the small, undercritical pulses (see cases FIG. 4), thereby somewhat reducing the maximum attainable contrast. In a matrix, the overall contrast can, under such circumstances, by improved of one could further reduce the voltage of the non switching pulses while keeping the voltage of the switching pulse.

Due to the coupling of the single pixels in a matrix, this is not possible in general. But one may e.g. somewhat reduce the pulse amplitudes on all non-selected lines, whereby the amplitude of non switching pulses on selected line increases. The high number of non-selected lines dominates so that the overall contrast can be enhanced, if only the increased pulse amplitude on the selected line can be kept low enough so that latching (full switching) of the FLC is prevented.

It is obvious that such kind of optimized driving will require more voltage levels than before. FIG. 19 shows e.g. one embodiment where the ratio of the switching pulse amplitude to the amplitude of non switching pulses on a selected pixel is 2.50 and to the major non switching amplitude on non-selected pixels is 3.33. The voltage levels used are given in FIG. 19.

Other practically convenient ratios down to 1.5 and up to 6, respectively, are easily obtained. One embodiment with the ratios 2 and 4, respectively, is shown in FIG. 20A. Here, also the area for (e.g.) down switching is increased by 50%, which may help in cases of asymmetric switching behaviour, as already discussed in chapters 9 and 11. Another embodiment with ratios 1.5 and 6 is shown in FIG. 20B.

We finally present in FIG. 21 another embodiment which can be used in case of asymmetric switching behaviour of an SSFLC-device. In this example the pulse height of non switching pulses is in the negative voltage direction, or the down switching direction, only 0.2 times the pulse height V of the switching pulses. In the positive voltage direction the selected non switching pulse height is 0.4 V. Full overall DC-compensation is retained. It should be further noted that the height of the DC-compensation pulse for the down switching pulse is only 0.8 V. It is obvious that other asymmetric pulse amplitude ratios can be obtained by properly chosing the row and column voltage levels. It is obvious that, if practically necessary, also the "UP" and "DOWN" switching pulses can be adjusted to get different amplitudes. Referring to FIG. 21 one may e.g. increase the height of the positive ("UP") switching pulse by 0.2 V and apply for DC-compensation a separate extra pulse of amplitude 0.2 V in the negative voltage direction.

EXAMPLES OF DEVICE EMBODIMENTS DEPENDING ON AN EFFICIENT DRIVING

14.1 Optical Memories

In a two-dimensional array the improved bistability, together with addressing schemes characterized by a high discrimination ration, would allow the construction of compact optical processors with memory. To safely scan the content of such a memory a significant but undercritical (non-latching) pulse will applied to each element in turn, on which the element may or may not shortly respond and then go back to its initial state (cf FIG. 4), i.e. keep its information. Bistability and economic driving sequences are also essential for high-performance linear arrays which could be handling large amounts of information for instance in printing, but more generally in optics, where an increasing number of storage and output devices have a binary character. We give an example where we think that the stated addressing principles in combination with a bistable linear array would be ideally suited.

14.2 Half-tone Picture Production with Addressed Linear Arrays.

It is well known that high quality half-tone pictures like photographs can be generated by coding the image content in binary form. The grey scale is contained in the positioning of the equal dots rather than in the size as in conventional raster printing. Many different coding systems are available, which the error diffusion linearization method and some related algorithms are most convenient for our purpose. This method is described in Floyd et al, Proc. SID 1976, Volume 17, page 78: cf also Bryngdahl, K. Op. Soc. Am. 1978, Volume 68, page 416, Billotet-Hoffman et al. Proc. SID 1983, Volume 24, page 253, and Hauck et al, J. Opt. Soc. Am. A., 1984, Volume 1, page 5. In the described application the photographic picture is optically scanned a line at a time and the digitalized content stored in relation to the fixed periodic raster comprised of the elements of the linear array. The sequentially generated information is then printed with a conventional electrophotographic process. With the driving schemes outlined above, a bistable linear array can be coupled to a simple microprocessor and embodies an extremely compact electronically controlled printing device capable of generating black-and-white half-tone pictures, and of printing whole pages or page plates for journals and magazines, thereby treating text and pictures in the same way and generating them in the same scan. Colour pictures would require three subsequent scans or three linear arrays supported with colour filters or using the birefringent eigen-colours. This small device in fact constitutes the heart of a small non-impact printing press. In an analogous way it can be used for the computer-controlled manufacturing of synthetic holograms and for many similar tasks, readily recognized by anyone skilled in the art.

We claim:

1. An addressing method for driving an array of electro-optic elements with a linear electric response, comprising a helix-free polymer or non-polymer liquid crystal with a ferro-electric or flexoelectric response and with at least two states, termed UP and DOWN polarization, interposed between a pair of substrates covered, on their opposing sides by, respectively, one set of $N \geqq 1$ lines, comprising horizontal stripe electrode rows and one set of $M \geqq 1$ lines, comprising vertical stripe electrode columns, and with each row-column crossing defining an electro-optic picture element or pixel, said method comprising a first step where, during a line addressing Time $\tau_e$, one type of voltage pulse train with a shape distributed over n time slots $\tau$, $\tau_e = n\tau$, is fed to a selected row whereas simultaneously one of two kinds of different pulse trains of the same duration is fed to each column, said pulse trains being so shaped that in the corresponding superimposed pulse train resulting from their superposition on each of the pixels in the selected row, there will appear a polar switching pulse of positive or negative sign, according to whether the pixel should be written in the UP or DOWN state, respectively, said polar pulse being characterized by an area in pulse amplitude and duration $A_s = (V\tau)_s$ larger than a critical threshold value $A_c$, whereas the pulse trains applied to pixels of the non-selected rows only contain voltage pulses having a subcritical area, $A_{n\text{-}s} < A_c$, said method further comprising repeating said step whereby rows are addressed in succession, thus writing the complete information embodied in all UP and DOWN states in one and the same scan of duration N $\tau_e$.

2. A method according to claim 1 where the superposition pulse train is characterized by a switching pulse amplitude $V_s$ larger than a DC threshold value $V_{DC}$ and the area of the switching pulse $A_s$ is in the range 1.2 $A_c \leqq A_c \leqq 1.5 A_s$, said pulse train further characterized in that said polar switching pulse is charge compensated by two or more polar pulses of opposite sign and integrated area equal to $A_s$, and wherein said superimposed pulse trains fed on non-selected pixels having charge-balanced positive and negative pulses with pulse amplitudes $V_{ns}$ lower than the cross over voltage $V_o$, preferably even lower than $V_{DC}$ and with areas $A_{ns}$ less than 0.5 $A_c$, said method further characterized by inserting zero voltage time slots in the select pulse trains to separate a switching pulse from a pulse of opposite polarity, or two otherwise continuous pulses of the same polarity belonging to successive pulse trains.

3. A method according to claim 2 further comprising compensating for an asymmetric UP/DOWN switching behaviour by shaping the pulse trains such that in said pulse trains either the positive or the negative switching pulse is immediately followed by a subcritical pulse of the same polarity to enhance the switching power for one of the two switching directions, and such that the pulse trains in general have different amplitudes in the positive and negative direction, preferably the non-select pulse trains $(PT)_{ns}$, with $V_{ns} \leqq 0.4\ V_s$ in one direction and $V_{ns} < 0.25\ V_s$ in the other direction, said compensation furthermore comprising a small bipolar (DC) bias in non-select pulse trains $(PT)_{ns}$, being charge balanced, in the select pulse trains $(PT)_s$, by one or a few large pulses of equivalent integral area and opposite polarity immediately in front of the UP or DOWN switching pulse.

4. A method according to claim 1 further comprising enhancing contrast in the event of a negative dielectric anisotropy of the liquid crystal, by symmetrically subdividing each pulse in the pulse trains fed to non-select rows, thus increasing the number of polarity reversals or individual polar pulses and leading to the appearance of different pulse amplitudes and areas in the regulating superposition pulse trains while enhancing their rms values and keeping charge balance on every pixel.

5. A method according to claim 1, further comprising selecting the pulse trains of duration $\tau_e$ supplied to the columns from a set of three different shapes, carrying the information for a pixel on a selected row to be switched UP or DOWN or to maintain its previous state, said pulse trains by superposition with the pulse train fed to the addressed row giving three alternative select superposition pulse trains on a select pixel, in which positive or negative switching pulses, $A_s > A_c$, appear, or only non-switching pulses with area $A_s < A_c$, respectively.

6. A method according to claim 1, further comprising scanning at any one time only those rows which contain pixels that are to change their state.

7. A method according to claim 1, wherein a latching time of the pixel is reduced and the contrast increased by a scanning procedure, in which the N rows are connected to drivers in high impedance mode, whereas the M columns are set to low impedance, performing said scanning either by switching one row after the other within said period $\tau_e$ from high impedance to low impedance, preferably at a constant voltage level, while the columns receive pulse trains for setting the state UP or DOWN or NO CHANGE, or performing said scanning by switching all columns for a duration $\tau_h < \tau_e$ to high impedance immediately after each scanned row is switched from low back to high impedance, or, during said scanning for a certain time interval $\tau_h > \tau_e$ all the rows, or all the rows and all the columns, are simultaneously switched to high impedance, this high impedance period $\tau_h$, being applied once or several times during the full scanning time, preferably at the end of each scan of a matrix array.

8. A device capable of grey-scale for generating a continuous shade of grey by partially switching pixels which are characterized by ferroelectric crystals forming a fine multi-domain structure, achieved by surface treatment, said multi-domain structure having a switching threshold $A_c$ varying locally over the pixel and thus giving the pixel a microscopically grainy appearance of optic states, microscopically fused together to a certain grey state, controllable by varying the voltage-time area of the applied switching pulse, either by modulating the pulse height or the pulse width above a certain voltage level, performed by modulating the relevant pulse in the column pulse trains, under keeping full DC-compensation.

* * * * *